(12) United States Patent
Julien et al.

(10) Patent No.: US 11,671,483 B2
(45) Date of Patent: Jun. 6, 2023

(54) IN-BAND PROTOCOL-BASED IN-NETWORK COMPUTATION OFFLOAD FRAMEWORK

(71) Applicant: Telefonaktiebolaget LM Ericsson (publ), Stockholm (SE)

(72) Inventors: Martin Julien, Montreal (CA); Ganapathy Raman Madanagopal, Bengaluru (IN); Ahsan Javed Awan, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/755,274

(22) PCT Filed: Oct. 30, 2019

(86) PCT No.: PCT/IB2019/059319
§ 371 (c)(1),
(2) Date: Apr. 26, 2022

(87) PCT Pub. No.: WO2021/084309
PCT Pub. Date: May 6, 2021

(65) Prior Publication Data
US 2022/0417323 A1    Dec. 29, 2022

(51) Int. Cl.
*H04L 67/1008* (2022.01)
*H04L 47/2441* (2022.01)
*H04L 67/1012* (2022.01)

(52) U.S. Cl.
CPC ...... *H04L 67/1008* (2013.01); *H04L 47/2441* (2013.01); *H04L 67/1012* (2013.01)

(58) Field of Classification Search
None
See application file for complete search history.

(56) References Cited

U.S. PATENT DOCUMENTS 7,590,736 B2 * 9/2009 Hydrie ............... H04L 67/1001
709/229
7,613,822 B2 * 11/2009 Joy ..................... H04L 67/1001
709/227

(Continued)

FOREIGN PATENT DOCUMENTS

WO    2016048527 A1    3/2016

OTHER PUBLICATIONS

International Preliminary Report on Patentability for Application No. PCT/IB2019/059319, dated May 12, 2022, 8 pages.

(Continued)

*Primary Examiner* — Backhean Tiv
(74) *Attorney, Agent, or Firm* — Nicholson De Vos Webster & Elliott LLP

(57) ABSTRACT

A method for offloading services of a sewer application in a network system. The method includes receiving, by a first in-network computation offload instance, a first request packet from a client application, wherein the first request packet includes a first application payload for processing by the server application; generating, by the first instance, a modified request packet that includes the first application payload and first offload information that describes the first instance for use by the server application in coordinating offloading processing to one or more in-network computation offload instances; and transmitting, by the first instance, the modified request packet to the next device in the traffic flow between the client application and the server application, wherein the next device is either (1) a second in-network computation offload instance in the traffic flow between the client application and the server application or (2) the sewer application.

23 Claims, 18 Drawing Sheets

(56) References Cited

U.S. PATENT DOCUMENTS

| | | | | |
|---|---|---|---|---|
| 8,121,135 B2* | 2/2012 | Thathapudi | ............ | H04L 47/365 |
| | | | | 370/252 |
| 8,553,693 B2* | 10/2013 | Wang | ...................... | H04L 69/32 |
| | | | | 370/392 |
| 8,964,554 B2* | 2/2015 | Petry | ..................... | H04L 47/365 |
| | | | | 370/235 |
| 9,250,954 B2* | 2/2016 | Dalal | ................... | G06F 13/4022 |
| 9,363,183 B2 | 6/2016 | Kumar et al. | | |
| 9,686,732 B2* | 6/2017 | Russell | ................. | H04W 40/20 |
| 9,923,835 B1* | 3/2018 | Singh | .................. | H04L 12/4633 |
| 10,111,024 B2* | 10/2018 | Chae | ................... | H04W 52/143 |
| 10,298,711 B2 | 5/2019 | Vacaro et al. | | |
| 10,389,596 B2* | 8/2019 | Strobel | ............... | H04L 41/5058 |
| 10,440,096 B2* | 10/2019 | Sabella | ............. | H04W 28/0205 |
| 10,491,718 B2* | 11/2019 | Arad | ........................ | H04L 69/12 |
| 10,516,649 B1* | 12/2019 | Jain | ........................ | H04L 63/168 |
| 10,541,947 B2* | 1/2020 | Melman | .................... | H04L 47/32 |
| 10,547,639 B2* | 1/2020 | Hoffmann | ............ | H04W 12/126 |
| 10,568,000 B2* | 2/2020 | Chae | ................. | H04W 28/0835 |
| 10,887,198 B2* | 1/2021 | Giust | .................. | H04L 41/0681 |
| 11,074,124 B2* | 7/2021 | Li | ........................... | G06F 3/0619 |
| 11,184,794 B2* | 11/2021 | So | ........................ | H04L 43/0817 |
| 2013/0318280 A1* | 11/2013 | Dalal | ................... | H04L 63/0227 |
| | | | | 710/316 |
| 2017/0163644 A1* | 6/2017 | Horii | ........................ | H04L 63/10 |
| 2017/0339074 A1* | 11/2017 | Melman | .............. | H04L 49/9084 |
| 2017/0339259 A1* | 11/2017 | Arad | ...................... | H04L 49/253 |
| 2018/0183855 A1* | 6/2018 | Sabella | ............. | H04W 52/0264 |
| 2018/0302439 A1* | 10/2018 | Hoffmann | ................ | H04L 47/12 |
| 2022/0167262 A1* | 5/2022 | Ding | ........................ | H04L 67/55 |
| 2022/0360645 A1* | 11/2022 | Badic | ...................... | H04L 67/51 |

OTHER PUBLICATIONS

International Search Report and Written Opinion for Application No. PCT/IB2019/059319, dated Jul. 27, 2020, 12 pages.

J. Halpern et al., "Service Function Chaining (SFC) Architecture," Oct. 2015, 32 pages, Internet Engineering Task Force (IETF), RFC 7665.

P. Quinn et al., "Network Service Header (NSH)," Jan. 2018, 40 pages, Internet Engineering Task Force (IETF), RFC 8300.

Ming Liu et al., "IncBricks: Toward In-Network Computation with an In-Network Cache," 2017, 15 pages, ACM.

"In-band Network Telemetry (INT) Dataplane Specification," Apr. 20, 2018, 42 pages, Version 1.0, The P4.org Applications Working Group.

* cited by examiner

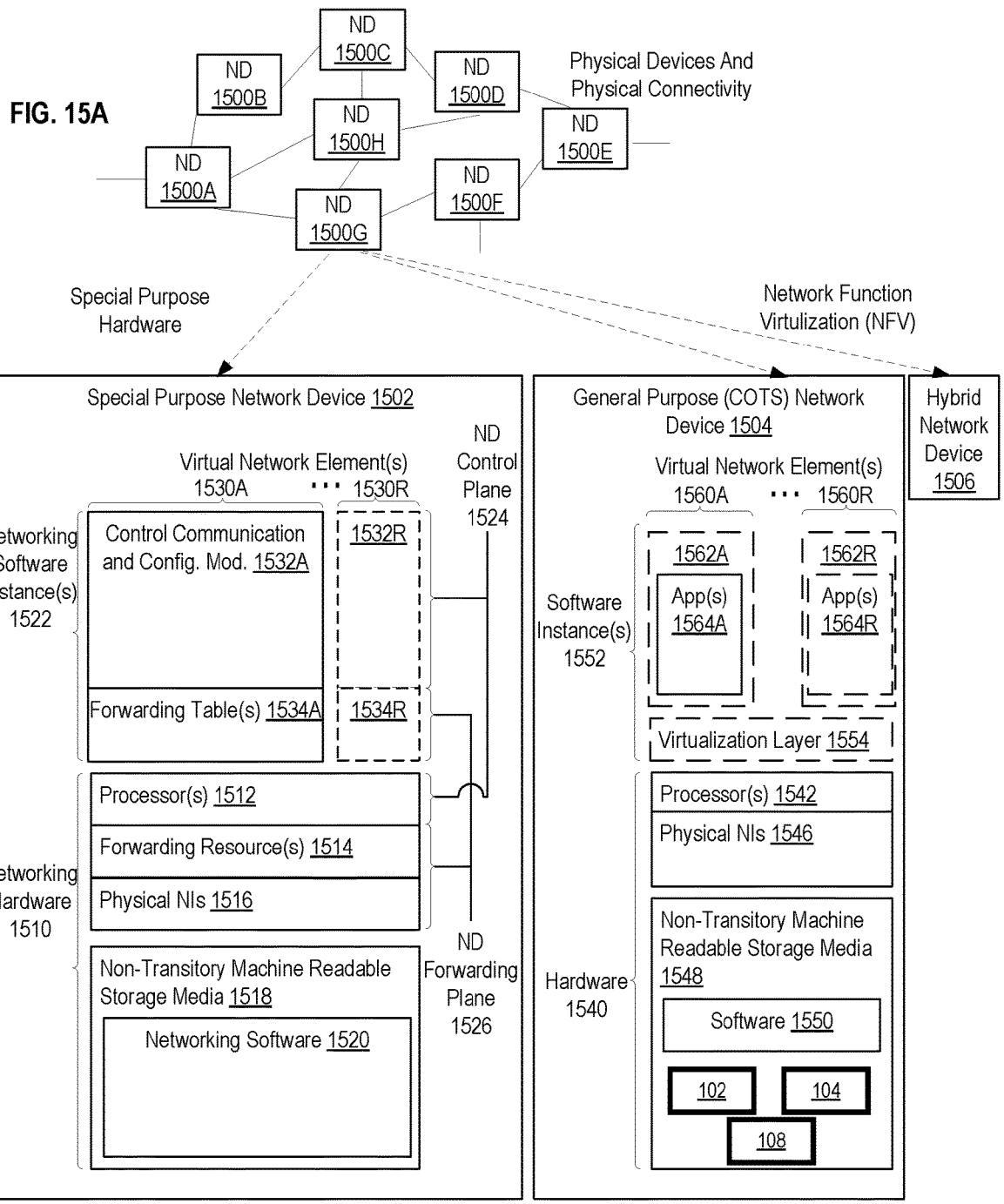
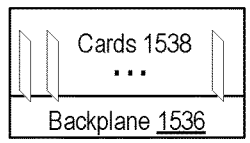

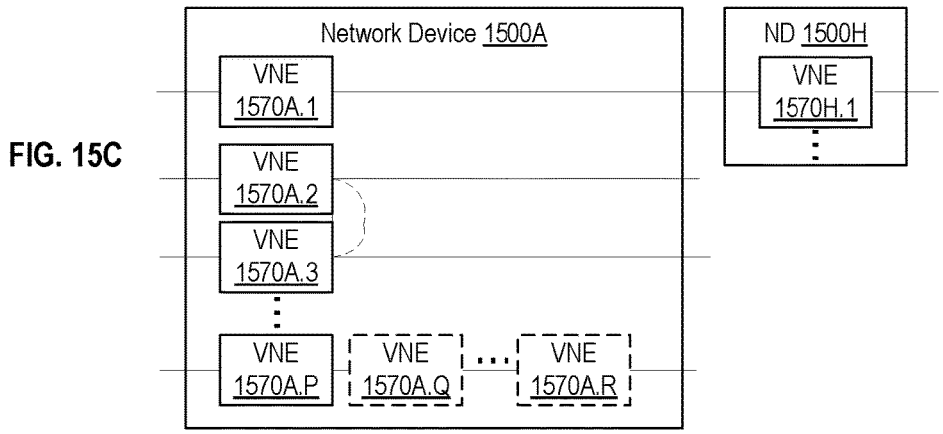
FIG. 15C
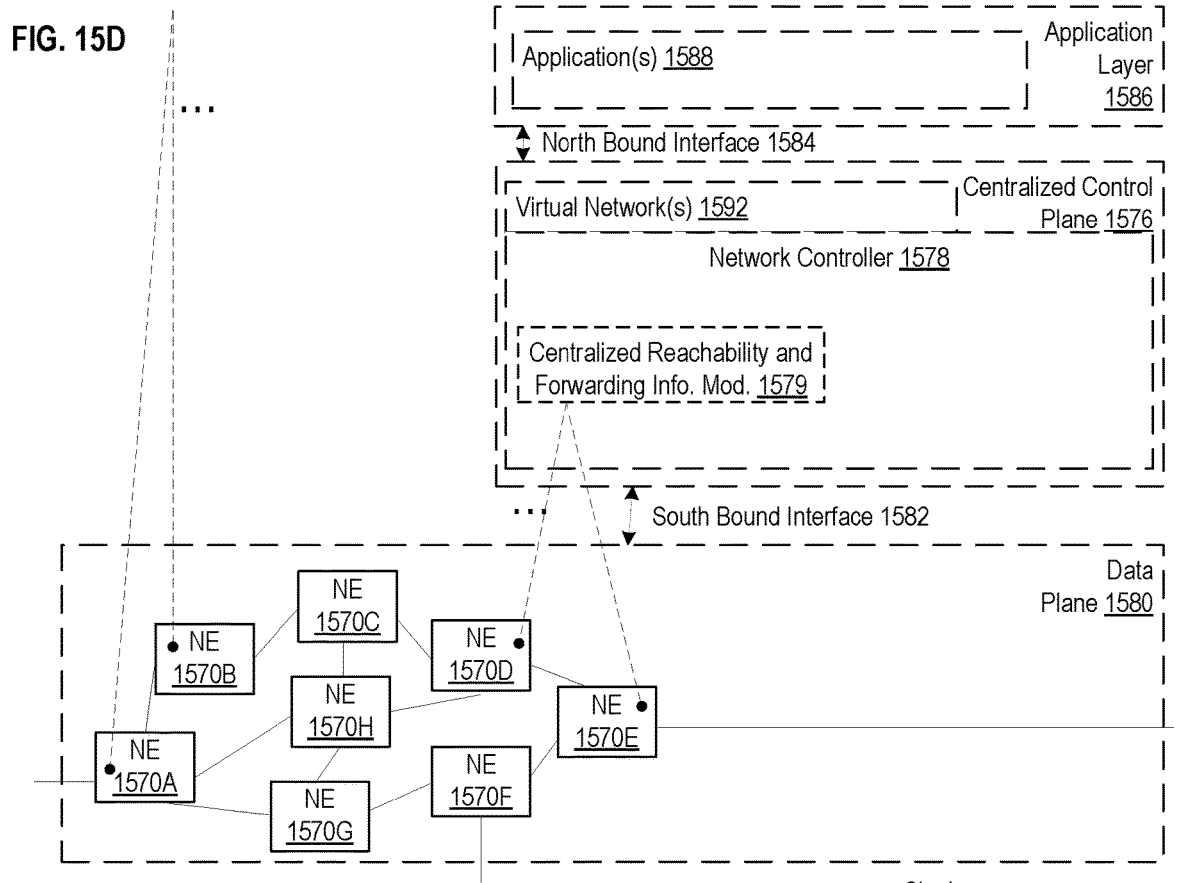
FIG. 15D
FIG. 15E
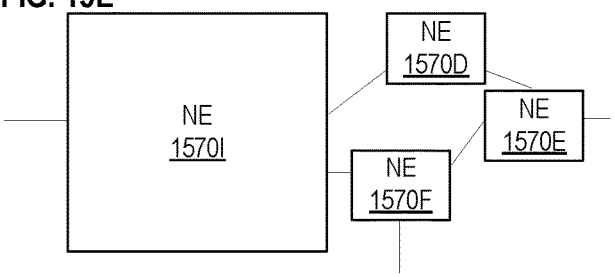
FIG. 15F
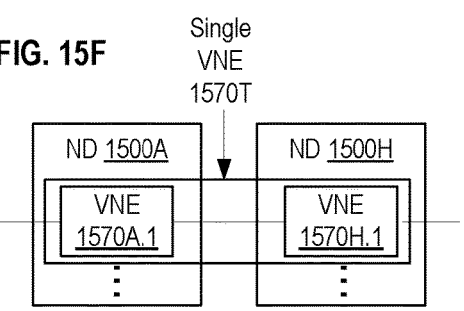

US 11,671,483 B2

IN-BAND PROTOCOL-BASED IN-NETWORK COMPUTATION OFFLOAD FRAMEWORK

CROSS-REFERENCE TO RELATED APPLICATIONS

This application is a National stage of International Application No. PCT/IB2019/059319, filed Oct. 30, 2019, which is hereby incorporated by reference.

TECHNICAL FIELD

Embodiments of the invention relate to the field of offloading operations of a server application; and more specifically, to generating offload information for coordinating the offload of operations of a server application.

BACKGROUND ART

As the Internet and wireless networks have quickly evolved, including expansion and increases in speed, smart phones and tablets have become extremely popular. This popularity in mobile devices has propelled the development of a number of highly innovative Internet-based services, which are often hosted in datacenters and cloud systems. To sustain growth, datacenters and cloud systems have also had to evolve quickly, including improvements to computing and storage resources as well as greater networking capacity.

In many cases, datacenters and cloud systems have largely relied on virtualizing their resources for hosting client applications more efficiently. As a result, many network functions were virtualized, such as firewalls, Network Address Translators (NATs), Ethernet switches, and Internet Protocol (IP) routers. The Internet Engineering Task Force (IETF) has suggested a solution architecture, which is referred to as Service Function Chaining (SFC), with the intention to steer network traffic between an ordered set of such virtualized network functions.

As momentum for hardware advances subsides, software designers and developers are required to do more with current hardware constraints. Accordingly, software developers are attempting to build smarter systems rather than simply relying on brute force to accomplish objectives. This has resulted in systems offloading specific processing tasks to specialized hardware accelerators, such as graphics processing units (GPUs), tensor processing units (TPUs), Field Programmable Gate Arrays (FPGAs), smart network interface cards (smart-NICs), and programmable Ethernet switches, to improve overall performance and computation efficiency.

In recent years, the emergence of programmable network devices has largely driven the idea of in-network computing. By offloading compute operations onto intermediate networking devices (e.g., smart-NICs, which include offload hardware such as FPGAs, CPUs, and GPUs, and Ethernet switches), it became possible to envision new innovative solutions to further improve the overall performance and computation efficiency of datacenters and cloud systems.

While some networks simply move data without performing computation on transmitted data, more modern cloud systems, enabled by programmable switches, can allow for more application-specific network function customization, providing terabit packet switching with a lightweight programmable forwarding plane. Similarly, network accelerators (e.g., smart-NICs) are equipped with scalable low-power multicore processors or FPGAs that support more substantial data plane computation at line rate in comparison to traditional NICs. Together, they offer in-transit packet processing capabilities that can be used for application-level computation as data flows through the network, enabling solutions for in-network computing.

With the advent of programmable network devices, the P4 In-band Network Telemetry (INT) specification was developed as an in-network function. The INT specification specifies a framework designed to allow the collection and reporting of network state by the data plane without requiring intervention by the control plane. In the architectural model presented by the INT specification, packets contain header fields that are interpreted as telemetry instructions by network devices. These instructions tell an INT-capable device what state to collect and write into the packet as it traverses the network. The INT specification suggests different encapsulation techniques for carrying the INT header within the packets used by applications.

Current Software Defined Network (SDN) solutions can use algorithms to specify optimal interconnect paths between client and server applications, leveraging on a centralized controller. However, these solutions remain unaware of needs of server applications and capabilities related to computation offloading. Further, when it comes to offloading specific server application functions/operations, there are a number of key parameters that must be taken into account for selecting the most suitable place(s) to offload the functions/operations. While some of those parameters (e.g., network topology, performance, service level agreements (SLAs), and network analytics) are considered when deploying server applications into cloud networks, server application requirements and capabilities for in-network computation offloading are not considered when deploying server applications.

Additionally, server applications that leverage in-network computation offload capabilities are using a proprietary implementation, specifically tailored to their needs. This makes it difficult to deploy new server applications or upgrade current server applications. Further, server applications are typically unaware of the relative real-time performance gain they could get by offloading some of their functions/operations onto networking devices.

As a consequence of the above, provisioning functions/operations through an out-of-band mechanism typically requires a lot of system resources and considerable integration efforts, including setting up out-of-band network channels and the development of provisioning processes destined to be running on the network devices.

SUMMARY

A method for offloading services of a server application in a network system, according to one embodiment, is described. The method includes receiving, by a first in-network computation offload instance, a first request packet from a client application, wherein the first request packet includes a first application payload for processing by the server application; generating, by the first in-network computation offload instance, a modified request packet that includes the first application payload and first offload information that describes the first in-network computation offload instance for use by the server application in coordinating offloading processing to one or more in-network computation offload instances; and transmitting, by the first in-network computation offload instance, the modified request packet to the next device in the traffic flow between the client application and the server application, wherein the next device is either (1) a second in-network computation offload instance in the traffic flow between the client application and the server application or (2) the server application.

A method for offloading services of a server application in a network system, according to another embodiment, is described. The method includes receiving, by the server application from a first server-specific in-network computation offload instance in a set of server-specific in-network computation offload instances, a modified request packet, wherein the modified request packet includes (1) a first application payload of a request packet from a client application in the network system and (2) first offload information from the set of server-specific in-network computation offload instances; determining, by the server application based on the first offload information, one or more in-network computation offload instances from the set of server-specific in-network computation offload instances, for offloading a set of operations of the server application; generating, by the server application, second offload information to identify and configure the one or more in-network computation offload instances for performing the set of operations for the server application; and transmitting, by the server application, a modified reply packet, which includes (1) a second application payload of a reply packet targeted to the client application and (2) the second offload information targeted to the one or more in-network computation offload instances.

An apparatus according to one embodiment is described for offloading services of a server application in a network system comprising processing circuitry and a memory. The memory contains instructions executable by the processing circuitry whereby the apparatus is operative to: receive a first request packet from a client application, wherein the first request packet includes a first application payload for processing by the server application; generate a modified request packet that includes the first application payload and first offload information that describes the first in-network computation offload instance for use by the server application in coordinating offloading processing to one or more in-network computation offload instances; and transmit the modified request packet to the next device in the traffic flow between the client application and the server application, wherein the next device is either (1) a second in-network computation offload instance in the traffic flow between the client application and the server application or (2) the server application.

An apparatus according to another embodiment is described for offloading services of a server application in a network system comprising processing circuitry and a memory. The memory contains instructions executable by the processing circuitry whereby the apparatus is operative to: receive, from a first server-specific in-network computation offload instance in a set of server-specific in-network computation offload instances, a modified request packet, wherein the modified request packet includes (1) a first application payload of a request packet from a client application in the network system and (2) first offload information from the set of server-specific in-network computation offload instances; determine, based on the first offload information, one or more in-network computation offload instances from the set of server-specific in-network computation offload instances, for offloading a set of operations of the server application; generate second offload information to identify and configure the one or more in-network computation offload instances for performing the set of operations for the server application; and transmit a modified reply packet, which includes (1) a second application payload of a reply packet targeted to the client application and (2) the second offload information targeted to the one or more in-network computation offload instances.

As described herein, a generic in-network computation offload framework is provided to allow server applications to dynamically leverage supporting network devices to provide server-specific tasks/operations on their behalf. The supporting network devices are deployed along the network traffic paths interconnecting client applications and server applications and the framework allows for the selection of a server-specific in-network computation offload instances based on a network traffic flow-based mechanism. When fully provisioned, an in-network computation offload instance can answer request packets on behalf of a server application. Otherwise, generic and server-specific in-network computation offload information is added to request packets destined to server applications. In particular, framework allows for generic in-network computation offload information (e.g., identities and timestamps) and server-specific in-network computation offload information (e.g., server-specific statistics) to be directly inserted and carried within request packets destined to server applications to provide in-band protocol signaling.

BRIEF DESCRIPTION OF THE DRAWINGS

The invention may best be understood by referring to the following description and accompanying drawings that are used to illustrate embodiments of the invention. In the drawings:

FIG. 15A illustrates connectivity between network devices (NDs) within an exemplary network, as well as three exemplary implementations of the NDs, according to some embodiments of the invention.

FIG. 15B illustrates an exemplary way to implement a special-purpose network device according to some embodiments of the invention.

FIG. 15C illustrates various exemplary ways in which virtual network elements (VNEs) may be coupled according to some embodiments of the invention.

FIG. 15D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 15E illustrates the simple case of where each of the NDs implements a single NE, but a centralized control plane has abstracted multiple of the NEs in different NDs into (to represent) a single NE in one of the virtual network(s), according to some embodiments of the invention.

FIG. 15F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DETAILED DESCRIPTION

Figure 1:
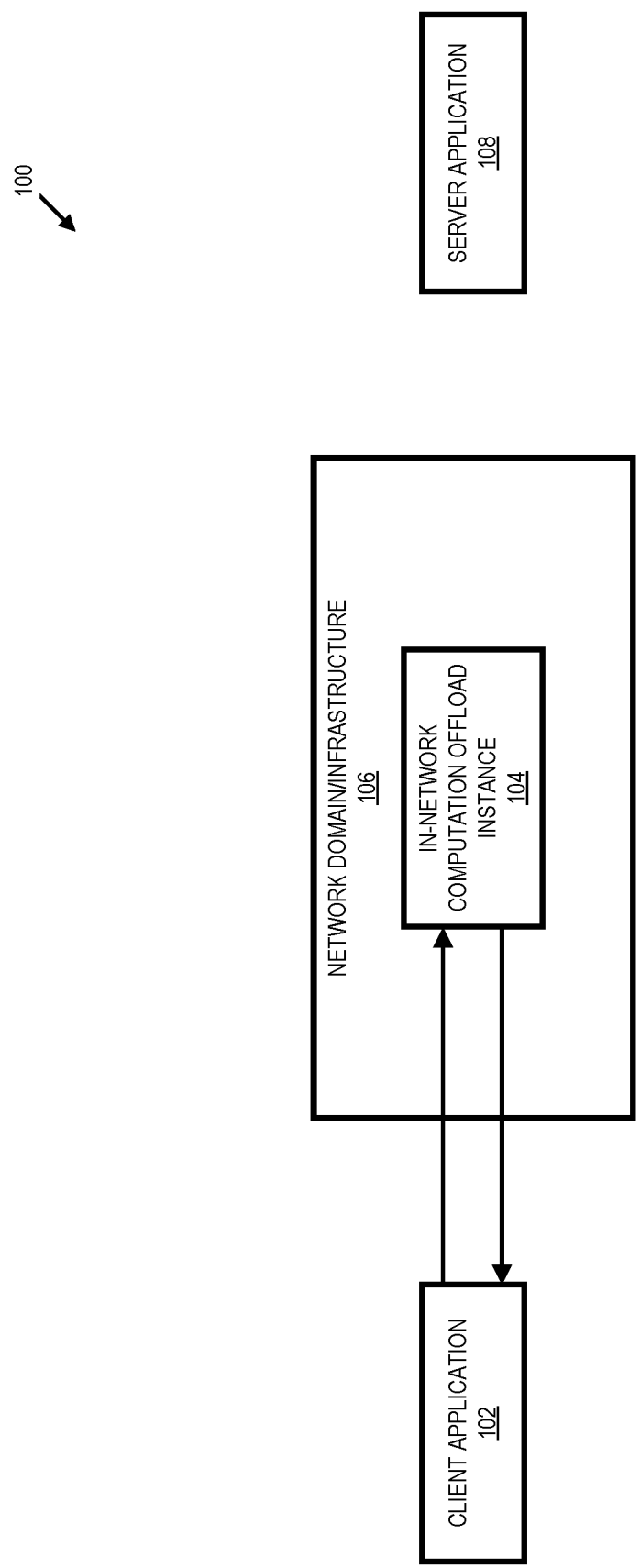
FIG. 1 shows a network system, according to some embodiments, in which a client application is directly interacting with an in-network computation offload instance such that the in-network computation offload instance provides offload services on behalf of a server application.

The following description describes methods and apparatus for offloading application workload using an in-band protocol-based in-network computation offload framework. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To fully benefit from the numerous advantages of cloud computing systems, applications have largely evolved from a client-server architecture to a service-oriented architecture. This means that applications have evolved to become implemented as a series of connected components/services distributed over and running on multiple servers with shared workloads. As a consequence of this evolution and technology trend in application architectures, data traffic between application components, within a cloud computing system, has significantly increased. For example, a client application can interact directly with a server application located in the same cloud system via a shared cloud network infrastructure. As used herein, "applications" may refer to general applications, application components, or services.

While computing resources are often provided via generic compute servers (e.g., x86-based compute servers), as described herein computing resources could also be provided by networking resources with enhanced computing capabilities (e.g., smart network interface cards (smart-NICs), which include offload hardware such as FPGAs, CPUs, and GPUs, and programmable Ethernet switches). Leveraging on such new/enhanced types of advanced networking resources, server applications could benefit from offloading some of their workload onto these supporting devices. For example, as shown in network system 100 of FIG. 1, a client application 102 is directly interacting with an in-network computation offload instance 104 (sometimes referred to as in-network service offload instance 104 or an offload instance 104) located within a network domain/infrastructure 106 such that the in-network computation offload instance 104 provides offload services on behalf of a server application 108. In this configuration, the in-network computation offload instance 104 is acting on behalf of the server application 108 such that the client application 102 does not interact directly with the server application 108 itself. However, this assumes that the server application 108 would have implemented some server application-specific processing logic on a set of network resources that would be capable of providing some services (sometimes referred to as operations or functions) on its behalf (i.e., the set of network resources would be capable of providing the in-network computation offload instance 104 to provide services on behalf of the server application 108). As used herein, each logical instantiation of server application-specific processing logic on a network resource can be referred to as an in-network computation offload instance (e.g., the in-network computation offload instance 104).

Figure 2:
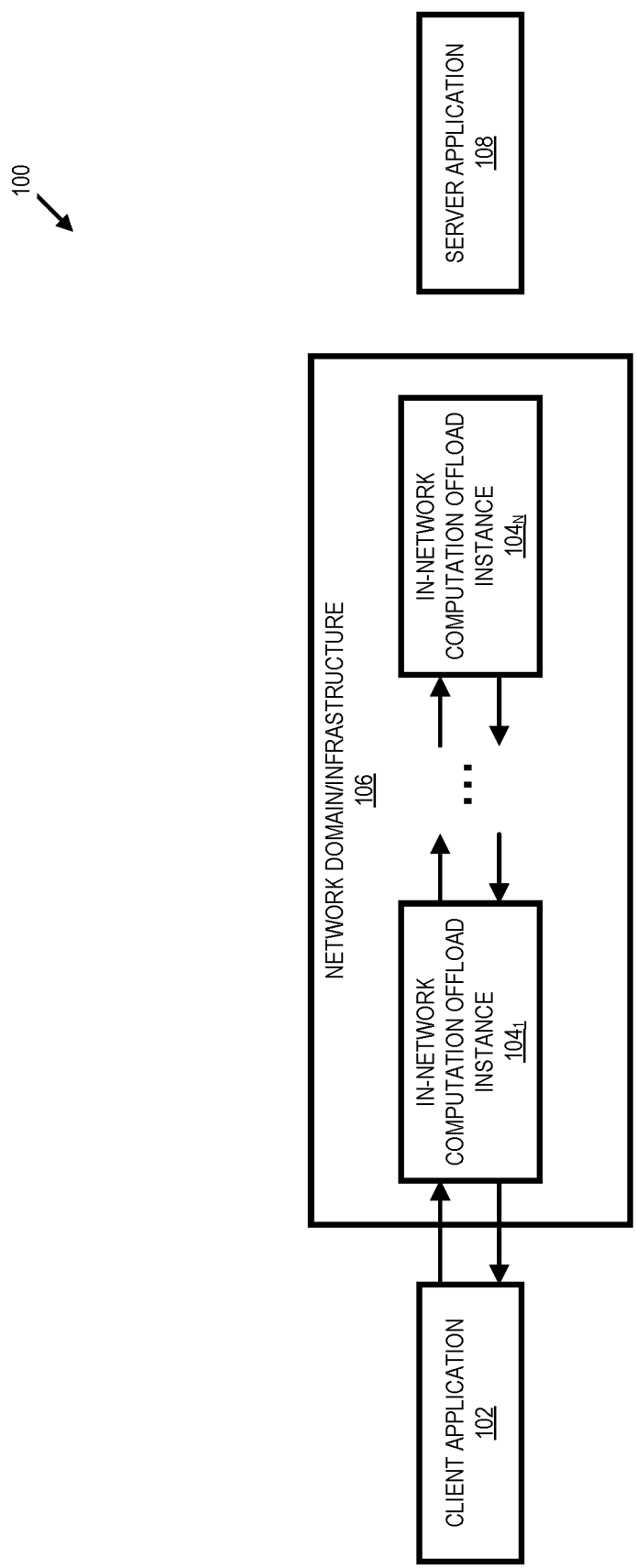
FIG. 2 shows a network system, according to some embodiments, in which a client application is interacting with multiple in-network computation offload instances such that the in-network computation offload instances provide offload services on behalf of a server application.

While FIG. 1 shows only one in-network computation offload instance 104 located within the network domain 106, FIG. 2 illustrates the fact that multiple in-network computation offload instances 104 could exist within the same network domain 106 of a network system 100. In particular, FIG. 2 shows that multiple in-network computation offload instances $104_1$-$104_N$ can exist on the network traffic path between the client application 102 and the server application 108 in the network domain 106. In such a scenario, the multiple in-network computation offload instances $104_1$-$104_N$ provide services on behalf of the server application 108.

Datacenters and cloud systems are often meant to scale massively. In many cases, datacenters and cloud systems host several hundred or several thousand computing and storage resources. To interconnect all those resources efficiently, large network infrastructures are required. As network infrastructures increase in size, more networking resources are potentially becoming available for offloading the workloads of server applications.

Figure 3:
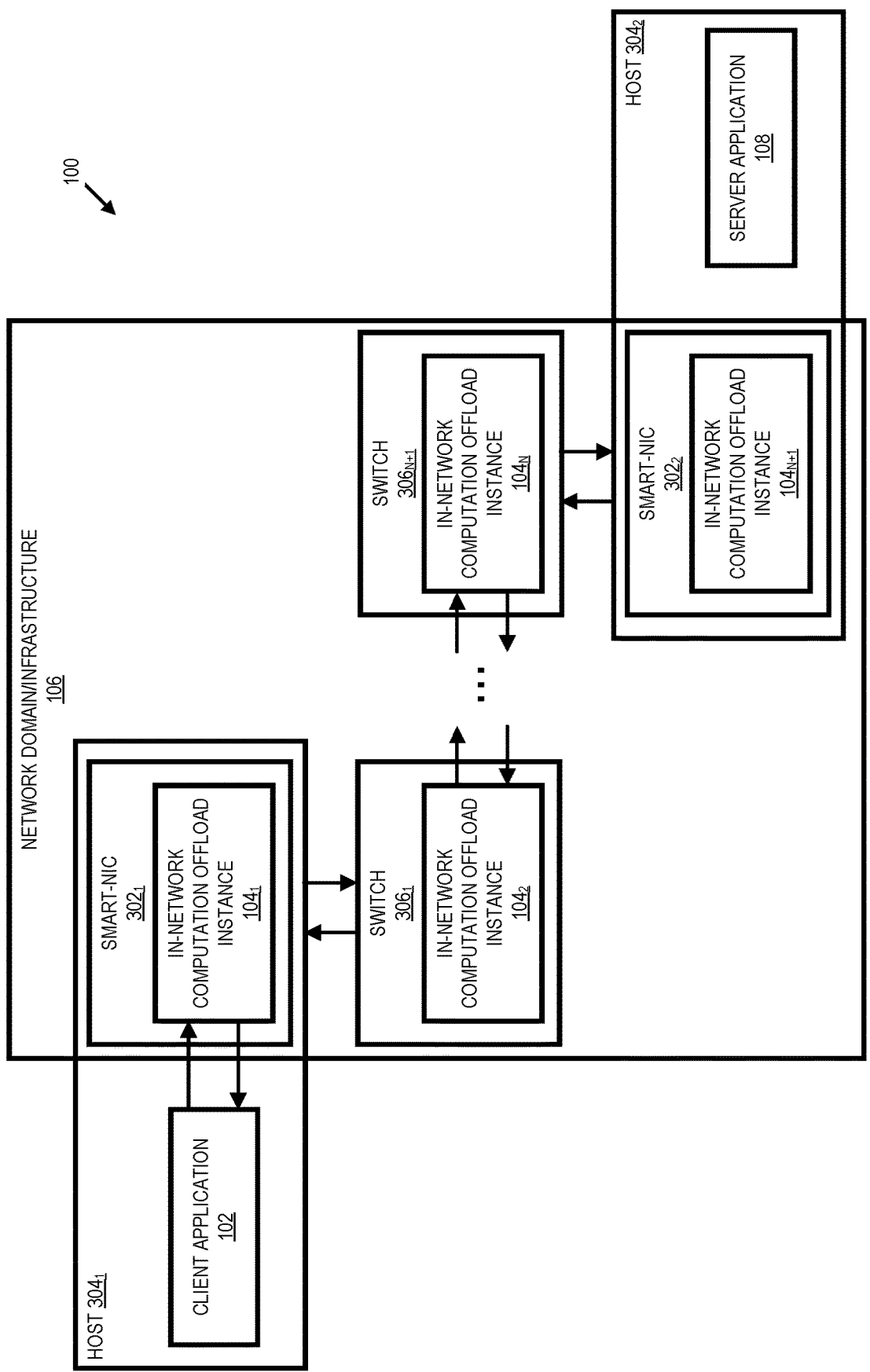
FIG. 3 shows the deployment of multiple in-network computation offload instances hosted on different networking elements of a network domain within a network system, in accordance with some embodiments.

While new networking infrastructure architectures and components could be used to provide support for in-network computation offload instances 104, it may be easier to leverage existing networking infrastructure architectures with enhanced networking elements to provide the required service offload capabilities. For example, FIG. 3 shows the deployment of multiple in-network computation offload instances $104_1$-$104_{N+1}$ hosted on different networking elements of the network domain 106 within a network system 100 (e.g., the in-network computation offload instance $104_1$ is hosted in the smart network interface card (NIC) $302_1$ of the host $304_1$, the in-network computation offload instance $104_2$ is hosted in the Ethernet switch $306_1$, the in-network computation offload instance $104_N$ is hosted in the Ethernet switch $306_{N+1}$, and the in-network computation offload instance $104_{N+1}$ is hosted in the smart-NIC $302_2$ of the host $304_2$).

Figure 4:
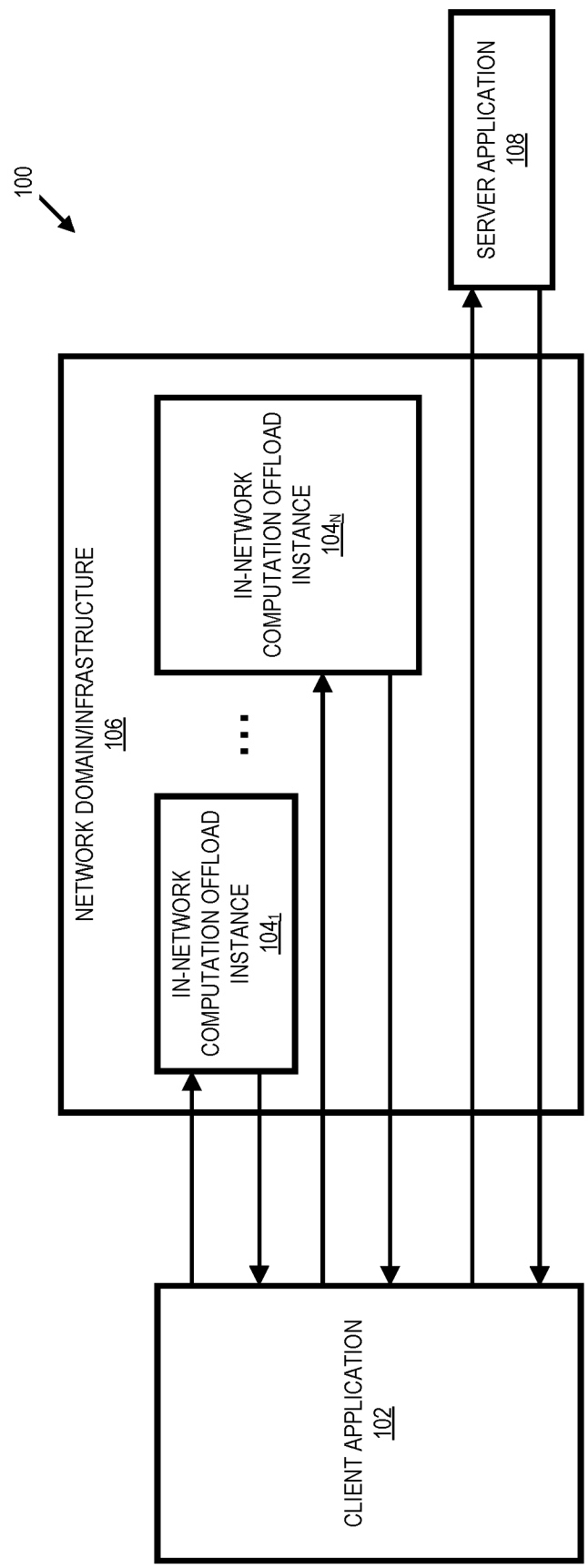
FIG. 4 shows a network system, according to some embodiments, in which a client application is interacting with multiple in-network computation offload instances and a server application, such that the in-network computation offload instances provide offload services on behalf of a server application.

In the case where multiple in-network computation offload instances 104 exist on the network traffic path between the client application 102 and the server application 108, one or more in-network computation offload instances 104 could be used to provide offload services in a selective fashion. For example, as shown in FIG. 4, while traffic, which is destined to the server application 108, originated from the client application 102, the traffic could be handled by the in-network computation offload instance $104_1$, the in-network computation offload instance $104_N$, which is located further from the client application 102 than the in-network computation offload instance $104_1$, or directly by the server application 108 itself. In particular, in the configuration of FIG. 4, the server application 108 could decide to deploy its server application-specific processing logic (sometimes referred to as a server application-specific service offload function) on any of the available in-network computation offload instances 104 to perform operations/tasks of the server application 108, depending on selection criteria of the server application 108. For example, the selection criteria of the server application 108 could prefer an in-network computation offload instance 104 that is closer to or further from the corresponding server application 108 or client application 102 and make offload processing selections based on this preference. Additionally, the server application 108 could prefer a particular in-network computation offload instance 104 to handle network traffic of a particular type in place of the server application 108.

Figure 5:
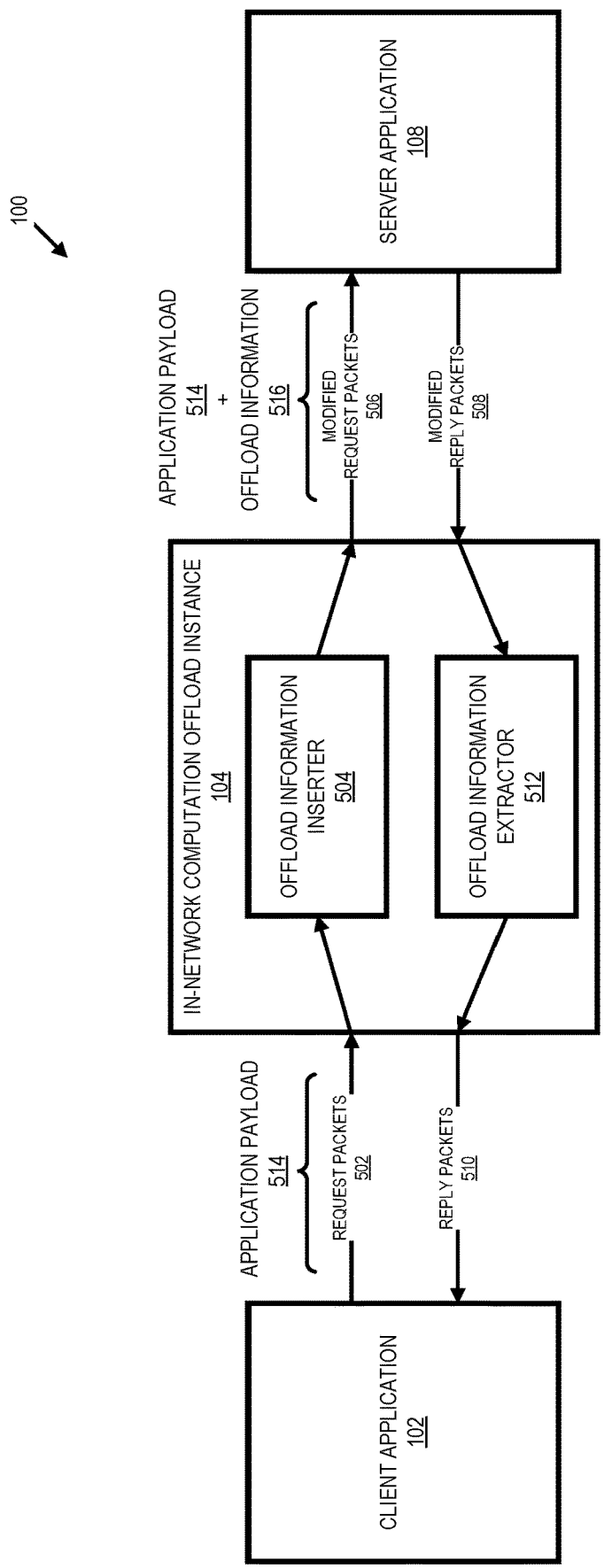
FIG. 5 shows a network system, according to some embodiments, in which packets traverse an in-network computation offload instance in the traffic path between a client application and a server application.

As noted above, the client application 102 can transmit request packets to the server application 108 (i.e., the server application 108 is the original target of the request packets). As request packets are sent from the client application 102 to the server application 108, this traffic will flow through network infrastructure and will potentially transit through one or more in-network computation offload instances 104, as described above. When a request packet transits through an in-network computation offload instance 104, extra server-specific offload information can be added to the packet. For example, as shown in FIG. 5, request packets 502 are transmitted from the client application 102 to the server application 108. The request packets 502 include an application payload 514 for processing. In the traffic path between the client application 102 and the server application 108, the in-network computation offload instance 104 adds server-specific offload information 516 (sometimes referred to as offload information 516, server-specific computation offload information 516, or computation offload information 516) to the request packets 502 via the offload information inserter 504 to generate the modified request packets 506. This extra server-specific offload information 516 can provide information on the in-network computation offload instance 104 itself (e.g., identity, capabilities, and characteristics, including the supported offload service functions of the in-network computation offload instance 104). The server-specific offload information 516 can be used by the server application 108 to identify the different in-network computation offload instances 104 available along the network traffic path with the client application 102, while also potentially providing other service offload-specific information (e.g. data analytics).

The server application 108 can receive, parse and use the server-specific offload information 516 provided by each in-network computation offload instance 104 in corresponding modified request packets 506. However, in some embodiments, the server-specific offload information 516 could be processed by a special function before reaching the server application 108. For example, a smart-NIC, which include offload hardware such as FPGAs, CPUs, and GPUs, or a virtual switch can process the modified request packets 506, which include the application payload 514 from the client application 102 and the offload information 516 from the in-network computation offload instance(s) 104, before the traffic can be forwarded to the targeted server application 108. Such a function could extract, parse, and store the server-specific offload information 516 for the server application 108 to request, when needed, using corresponding interfaces.

When modified request packets 506 are received by the server application 108, the server application 108 seeks to provide a set of requested service(s) to the client application 102. As the server application 108 performs their intended/requested services/operations, the server application 108 can also consider whether the same operations should be offloaded to one or more in-network computation offload instances 104 of the network system 100 (i.e., whether the overhead involved in offloading the operations/services would yield sufficient performance gains in comparison to performance by the server application 108 itself). For that purpose, the extra server-specific offload information 516 could be used to better orchestrate server-related in-network computation offload capabilities. For example, the server application 108 could leverage server-specific offload information 516 to help determine which in-network computation offload instance 104 could best fulfill its service offload requirements. Since different in-network computation offload instances 104 could provide different capabilities and amounts of available resources, as well as the fact that different client applications 102 and server applications 108 might also be constrained by some specific service level agreement (SLA) requirements, the server application 108 may select the most suitable in-network computation offload instance(s) 104 to offload operations/tasks/services of the server application 108. While in some scenarios it may be preferable to select an in-network computation offload instance 104 as close as possible to a client application 102 to minimize latency, in other scenarios it could be preferable to select an in-network computation offload instance 104 further from the client application 102 (e.g., closer to the server application 108 or the in-network computation offload instances 104 are selected to maximize a distance from the client application 102) to better accommodate multiple instances of client applications 102 and optimize overall resource utilization.

Once a server application 108 has completed its operations/services corresponding to a set of request packets 502, if the server application 108 has determined that further similar request packets 502 should be offloaded to in-network computation offload instance(s) 104 of a network resource, then a reply packet 510 is generated along with server-specific offload information 516 to produce a modified reply packet 508. The extra offload information 516 can be used to identify the selected in-network computation offload instance(s) 104 and to provide instructions and data related to the requested offloaded workload (i.e., logic describing the operations/services to be performed by the in-network computation offload instances). For example, if the server application 108 requests an in-network computation offload instance 104 to provide context values to the client application 102 on the service application's 108 behalf, then the offload information 516 can specify the data to be inserted into specific tables, such that the corresponding in-network computation offload instance 104 can directly reply based on these populated tables when such context information is requested.

As shown in FIG. 5, when modified reply packets 508 transit through the selected in-network computation offload instance 104, server-specific offload information 516 is extracted and interpreted by the in-network computation offload instance 104 as privileged information from the server application 108 (e.g., using the offload information extractor 512). An in-network computation offload instance 104 can determine whether it was selected for performing operations/services of the server application 108 by (1) examining/processing the provided server-specific offload information 516 and/or (2) using other techniques, such as packet header indicators in the modified reply packets 508. As the server-specific offload information 516 is processed, the in-network computation offload instance 104 follows the instructions/logic provided by the requesting server application 108. For example, the instructions might specify that data should be provisioned in tables used by an in-network computation offload function or perform other packet processing operations on the corresponding request packets 502 on behalf of the server application 108. Accordingly, information could be provided by a server application 108 to offload its workload for similar subsequent request packets 502, including allowing the possibility to also offload having to reply directly to a request packet 502 by sending the minimum needed information and instructions to an in-network computation offload instance 104 to complete its request-related workload on behalf of the server application 108.

Although the server-specific offload information 516 is described in relation to (1) the data/information generated by the in-network computation offload instances 104 and added to the request packets 502 to generate the modified request packets 506 and (2) the data/information generated by the server application 108 and added to the reply packets 510 to create the modified reply packets 508, the server-specific offload information 516 in each case can be different, as will be described in greater detail below. In some cases, the data/information generated by the in-network computation offload instances 104 and added to the request packets 502 to generate the modified reply packets 506 may be referred to as instance offload information. In contrast, the data/information generated by the server application 108 and added to the reply packets 510 to create the modified reply packets 508 may be referred to as server offload information.

Figure 6:
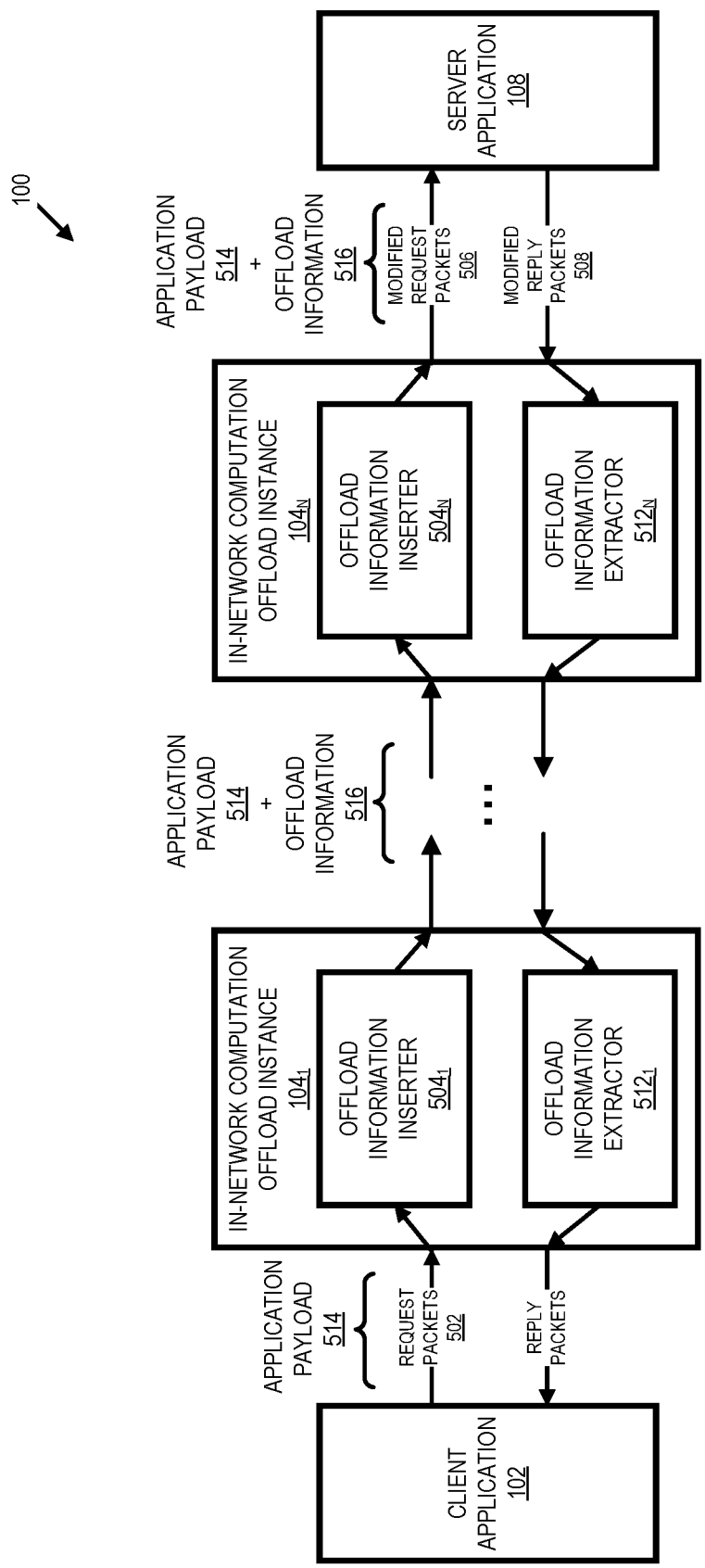
FIG. 6 shows a network system, according to some embodiments, in which packets traverse multiple in-network computation offload instances in the traffic path between a client application and a server application.

While FIG. 5 shows a single in-network computation offload instance 104, FIG. 6 illustrates a use case where traffic transits through multiple in-network computation offload instances $104_1$-$104_N$ to reach the server application 108. In this scenario, each in-network computation offload instance 104 can be requested to add extra server-specific offload information 516 to request packets 502 destined to the server application 108, as shown in FIG. 6. As described above, the server application 108 could leverage the offload information 516 provided by each in-network computation offload instance 104 to determine the most suitable in-network computation offload instance(s) 104 to use for offload purposes.

When multiple in-network computation offload instances 104 are located on the traffic path between the client application 102 and the server application 108, the server application 108 can add server-specific offload information 516 separately targeted to each in-network computation offload instance 104. This could potentially allow the server application 108 to offload operations between multiple in-network computation offload instances 104 or provide the same offload operations to multiple in-network computation offload instances 104 (e.g., depending on quality-of-service (QoS) or for purposes of high-availability).

Figure 7:
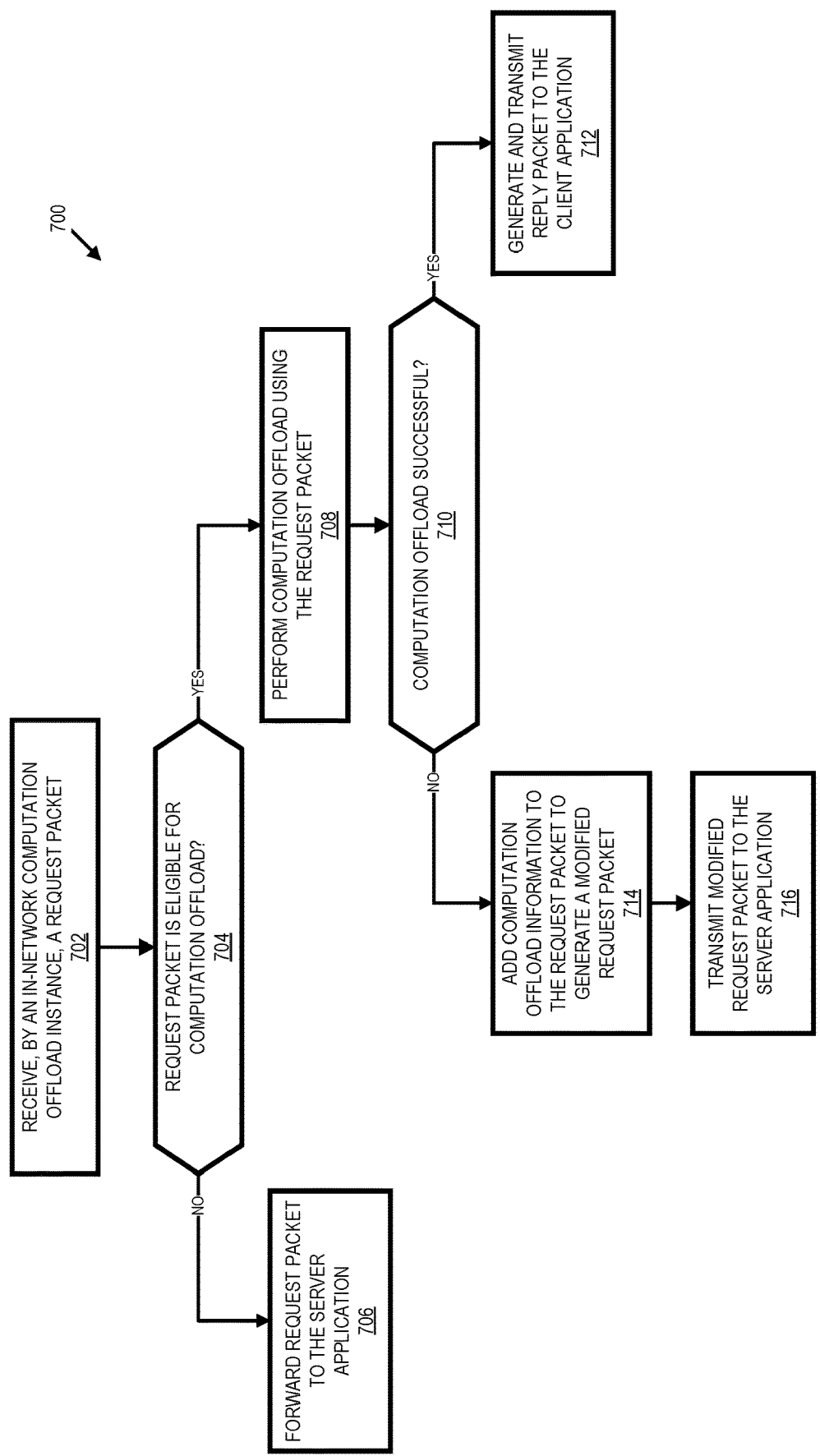
FIG. 7 shows a method for packet processing implemented by an in-network computation offload instance when request packets are received, according to some embodiments.

Turning now to FIG. 7, a method 700 will be described for packet processing implemented by in-network computation offload instances 104 when request packets 502 are received. The operations in the flow diagram of FIG. 7 will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagram of FIG. 7.

As shown in the method 700 of FIG. 7, when a request packet 502 is received by an in-network computation offload instance 104 at operation 702, the in-network computation offload instance 104 can check to determine whether in-network computation offload functionality of the in-network computation offload instance 104 should be used at operation 704. Such a check can be based on traffic flow identification (e.g., using Ethernet/Internet Protocol (IP) addresses, transport protocols, and port numbers) to determine whether in-network computation offload capabilities of the in-network computation offload instance 104 should be offered for the corresponding traffic flow/request packet 502.

This check allows the filtering of network traffic efficiently, as an offload operation/service might only be useful for specific network traffic instead of all traffic. In some embodiments, the identification of traffic flows can indicate which offload operation(s)/service(s) (sometimes referred to as server-specific service offload processing logic) to perform, as several different functions might be deployed on an in-network computation offload instance 104. When the check at operation 704 fails to find a service offload function or the in-network computation offload instance 104 otherwise determines that in-network computation offload functionality of the in-network computation offload instance 104 should not be used for the received request packet 502, the request packet 502 is forwarded to the server application 108 at operation 706.

Otherwise, when the check at operation 704 indicates that in-network computation offload capabilities are locally supported for the corresponding traffic flow (i.e., the request packet 502), the corresponding server-specific service offload processing logic is executed (i.e., the in-network computation offload instance 104 performs computations for the server application 108 using the request packet 502) at operation 708. Depending on server-specific offload specifications, the required implementation logic might involve specific packet parsing, processing, and modifications of the request packet 502. In the case where the server-specific computation offload completes successfully, as determined at operation 710, the in-network computation offload instance 104 can answer the request packet 502 on behalf of the server application 108 by generating and transmitting a reply packet 506 to the corresponding client application 102 at operation 712. In such a case, the request packet 502 does not need to be forwarded to the destined server application 108, as the in-network computation offload instance 104 can reply to the client application 102 on behalf of the server application 108.

Conversely, when the in-network computation offload instance 104 determines at operation 710 that the server-specific computation offload did not complete successfully or otherwise cannot be provided by the in-network computation offload instance 104, the in-network computation offload instance 104 adds server-specific computation offload information 516 to the corresponding request packet 502 to generate a modified request packet 506 at operation 714, and the modified request packet 506 is forwarded towards the server application 108 at operation 716.

Figure 8:
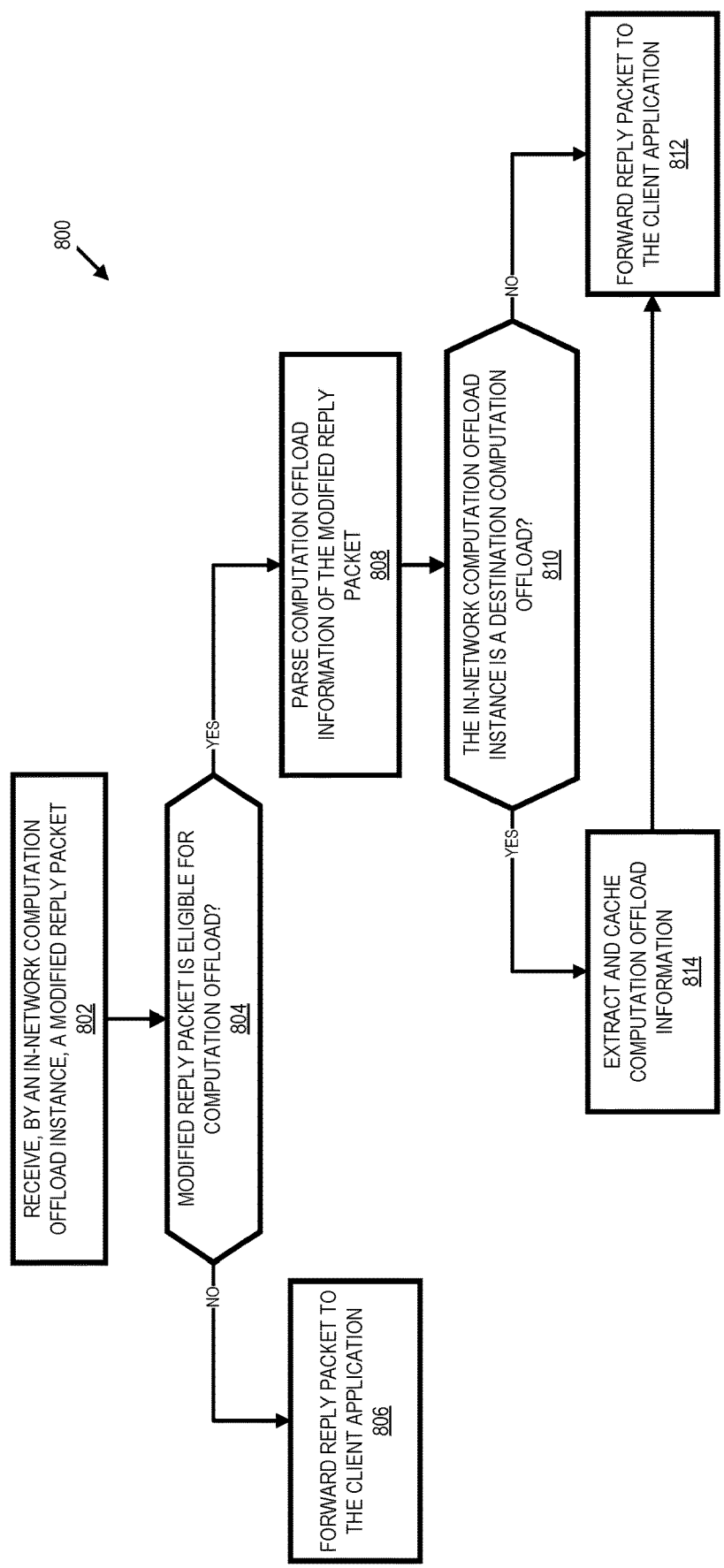
FIG. 8 shows a method for packet processing implemented by an in-network computation offload instances when reply packets are received, according to some embodiments.

Turning now to FIG. 8, a method 800 will be described for packet processing implemented by in-network computation offload instances 104 when reply packets (e.g., modified reply packets 508) are received. The operations in the flow diagram of FIG. 8 will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagram of FIG. 8.

As shown in FIG. 8, when a modified reply packet 508 is received by an in-network computation offload instance 104 at operation 802, a check is made at operation 804 to determine whether in-network computation offload functionality of the in-network computation offload instance 104 should be used for the modified reply packet 508. Such a check could be based on traffic flow identification of the modified reply packet 508 (e.g., using Ethernet/IP addresses, transport protocols, and port numbers) to determine whether in-network computation offload capabilities of the in-network computation offload instance 104 should be used for the corresponding traffic flow. This check allows the filtering of network traffic efficiently as an offload operation/service might only be useful for specific network traffic instead of all traffic. In some embodiments, the identification of traffic flows would indicate which offload operation/service to perform, as several different functions/pieces of logic might be deployed on an in-network computation offload instance 104. When the check at operation 804 fails to find a service offload function or the in-network computation offload instance 104 otherwise determines that in-network computation offload functionality of the in-network computation offload instance 104 should not be used for the received modified reply packet 508, the reply packet 510 (i.e., any offload information 516 from the modified reply packet 508 is removed to generate the reply packet 510) is forwarded to the client application 102 at operation 806.

Otherwise, when the check at operation 804 indicates that in-network computation offload capabilities are locally supported for the corresponding traffic flow (i.e., the modified reply packet 508), the in-network computation offload information 516 of the modified reply packet 508 provided by the server application 108 is parsed at operation 808 to determine at operation 810 whether the local in-network computation offload instance 104 was selected as a destination for providing service offload capabilities. If the in-network computation offload instance 104 was not selected as a destination for providing service offload capabilities, the reply packet 510 is forwarded towards the client application 102 at operation 812.

Otherwise, in-network computation offload information 516 is extracted from the modified reply packet 508 (i.e., offload information 516 from the modified reply packet 508 is removed to generate the reply packet 510) and cached at operation 814 such that in the future, server-specific service offload processing logic is executed. Depending on server-specific service offload specifications, the required implementation logic might involve specific packet parsing, processing, and modifications of request packets 502 received in the future. Once the in-network computation offload logic has completed successfully, the reply packet 510 is forwarded towards the client application 102 at operation 812.

Optionally, a server application 108 might not have executed completely a request packet 502, leaving some of the processing work to an in-network computation offload instance 104 for completion. In such a case, the server application 108 can provide the required information and instructions as part of the in-network computation offload information 516 included in the modified reply packet 508. Once the in-network computation offload information 516 is extracted from the modified reply packet 508, the corresponding server-specific service offload processing logic is executed. In the case where the server-specific service offload implementation completes successfully, the in-network computation offload instance 104 prepares and transmits a reply packet 510 to the corresponding client application 102.

Figure 9:
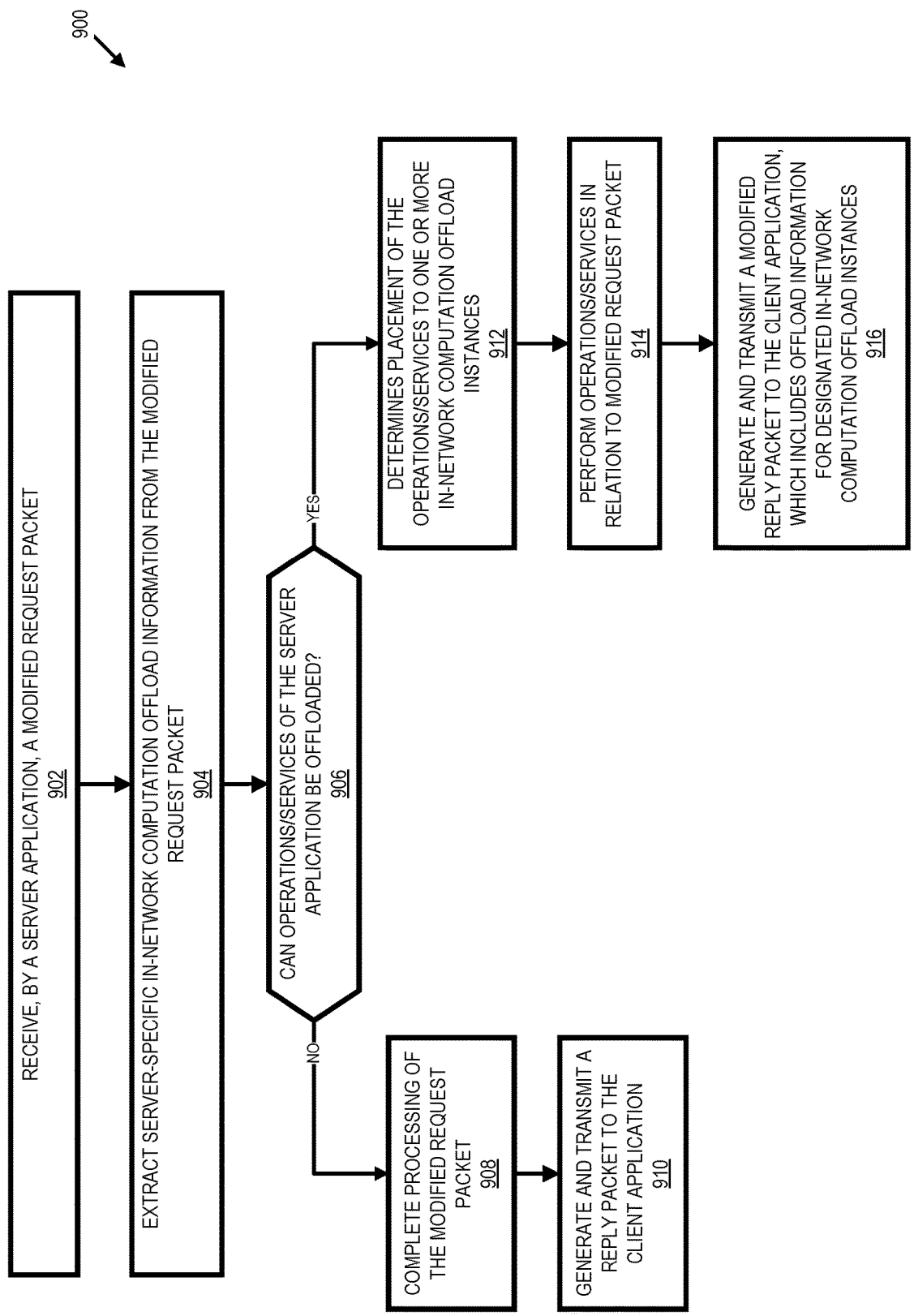
FIG. 9 shows a method for offloading request packet processing, according to some embodiments.

Turning now to FIG. 9, a method 900 will be described for offloading request packet 502 processing. The operations in the flow diagram of FIG. 9 will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagram of FIG. 9.

As shown in FIG. 9, when a modified request packet 506 is received by a server application 108 at operation 902, the received server-specific in-network computation offload information 516 is extracted and validated by the server application 108 at operation 904. In particular, since the server-specific in-network computation offload information 516 could be used by packet processing logic of the server application 108, this offload information 516 is extracted before processing an application payload 514 of the modified request packet 506. As described above, the server-specific in-network computation offload information 516 received provides information on each in-network computation offload instance 104 (e.g., identity, capabilities, characteristics, and supported offload service function(s)). The server-specific computation offload information 516 can be used by the server application 108 to identify the different in-network computation offload instances 104 that are available along the network traffic path with client application 102, while also potentially providing other service offload-specific information (e.g., data analytics). The server application 108 can use the server-specific computation offload information 516 as a dynamic discovery mechanism for in-network computation offload instances 104 as well as for potentially building useful data analytics related to client application 102 requests and in-network computation offload efficiency.

As the server application 108 performs normal operations, the server application 108 can also consider whether the same operations would be worth to offload to in-network computation offload instance(s) 104 of the network domain 106. Accordingly, the server application 108 checks at operation 906 to determine whether one or more in-network computation offload instances 104 could be used by the server application 108 for operation/service offload purposes. Such a check can be based on traffic flow identification (e.g., using Ethernet/IP addresses, transport protocols, and port numbers) to determine whether in-network computation offload capabilities should be offered by in-network computation offload instances 104 for the corresponding traffic flow. When it is determined that no operation/service offload functions should be provided at operation 906, the server application 108 completes processing of the modified request packet 506 at operation 908 and generates and forwards a reply packet 506 to the client application 102 at operation 910.

When a server application 108 determines at operation 906 that some of its workload can be offloaded to in-network computation offload instance(s) 104, the server application 108 determines placement of the corresponding operations/services to one or more in-network computation offload instances 104 at operation 912. This placement determination can take into account the capabilities and the characteristics of each in-network computation offload instance 104, the SLA of the corresponding client application 102 and server application 108, as well as network and service-related statistics. After running the service offload placement logic, the server application 108 could determine that one or more in-network computation offload instances 104 should be used for offloading operations/services of a server application 108, which could also be based on the intended server application 108 characteristics, such as performance and high-availability. Thereafter, the server application 108 performs operations/services in relation to the application payload 514 of the modified request packet 506 at operation 914. Following successful completion of the operations/services, the server application 108 generates and transmits a modified reply packet 508 to the client application 102 at operation 916. The modified reply packet 508 include offload information 516 for consumption by designated in-network computation offload instances 104 that indicate the operations/services to be performed by the in-network computation offload instances 104.

As mentioned above, extra server-specific offload information 516 can be added to request packets 502 sent from client applications 102 to form modified request packets 506, as well as to reply packets 510 sent from server applications 108 to form modified reply packets 508. In some embodiments, the extra server-specific offload information 516 can be generic to all server applications 108 while in other embodiments, the server-specific offload information 516 can be specific to each server application 108.

With respect to modified request packets 506, the server-specific offload information 516 can provide information relative to each in-network computation offload instance 104 (e.g., identity/identifier, capabilities, and characteristics, including the supported offload service functions of the in-network computation offload instance 104). The server-specific offload information 516 could be useful to server applications 108 to determine the different in-network computation offload instances 104 available along the network traffic path with client applications 102, while also potentially providing other service offload-specific information (e.g. network and service-related data analytics).

For modified request packets 506, the server-specific offload information 516 could potentially include an in-network computation offload instance 104 identifier (e.g., a name, type, and/or description of the in-network computation offload instance 104). This parameter can provide information to server applications 108 about the identity of the in-network computation offload instance 104, which could include information indicating software and hardware aspects of the in-network computation offload instance 104.

In some embodiments, the server-specific offload information 516, in relation to modified request packets 506, could include a service offload identifier (e.g., a name, type, description, and/or capabilities of the in-network computation offload instance 104). This parameter can provide information to server applications 108 about the identity of supported server-specific computation offload operations/tasks. Considering that several server-specific computation offload operations could be deployed on the same in-network computation offload instance 104, this parameter can be used to identify each operation supported by the in-network computation offload instance 104 such that the server application 108 could potentially use the instance 104 for performing/offloading the operation/task.

In some embodiments, the server-specific offload information 516, in relation to request packets 502, could include service offload resources (e.g., total and/or free memory and/or CPU resources). This parameter can provide information to server applications 108 about the resources allocated to the corresponding service offload operation, client application 102, and/or server application 108. Accordingly, this parameter can indicate the overall resources allocated to the operation, the client application 102, and/or the server application 108, as well as its characteristics. For example, the server-specific offload information 516 could be used to specify (1) the total number of table entries allocated to an operation, a client application 102, and/or a server application 108, (2) the number of table entries currently used, and/or (3) the maximum intended processing capacity in terms of allocated bandwidth.

In some embodiments, the server-specific offload information 516, in relation to modified request packets 506, could potentially include one or more timestamps (e.g., an ingress timestamp for the request packet 502 and an egress timestamp for the modified request packet 506). This parameter can provide information to server applications 108 about the time that a request packet 502 was received and/or a modified request packets 506 departed an in-network computation offload instance 104. Using this information, a server application 108 can estimate latency and jitter values if its workload were to be handled by this corresponding in-network computation offload instance 104.

In some embodiments, the server-specific offload information 516, in relation to modified request packets 506, could potentially include service offload analytics (e.g., the number of hits and rates). This parameter can provide information to server applications 108 about function-specific data analytics. In particular, since in-network computation offload instances 104 could provide offload services on behalf server applications 108, such information could be used to report service usage to server applications 108 at specified intervals. This analytics information could be valuable to justify the location of specific service offload workloads, as well as the amount of resources allocated to such functions.

As request packets 502/modified request packets 506 are transiting through one or more in-network computation offload instances 104, server-specific offload information 516 is appended to these request packets 502/modified request packets 506 by each instance 104 in an order reflecting the sequence by which the request packets 502/modified request packets 506 are transiting through the in-network computation offload instances 104. By respecting this order, the server applications 108 can estimate the relative distance of each in-network computation offload instance 104 from client application 102 and each server application 108.

For reply packets 508, server applications 108 can add server-specific computation offload information 516 to provide information relative to the selected in-network computation offload instance(s) 104 for service offload purposes, including indicating selected server-specific computation offload task(s). As reply packets 508 are transiting through one or more in-network computation offload instances 104, server-specific computation offload information 516 is validated and extracted by the destined in-network computation offload instance(s) 104 for processing. As server-specific computation offload information 516 is consumed by in-network computation offload instance(s) 104, this information 516 does not reach any client applications 102 and processing by the in-network computation offload instance(s) 104 is transparent to the client applications 102.

For reply packets 510/508, the server-specific computation offload information 516 includes information that assists in-network computation offload instance(s) 104 to configure requested offload tasks. For example, for modified reply packets 508, the server-specific computation offload information 516 can include an in-network computation offload instance 104 identifier (e.g., a name, type, and/or description of the in-network computation offload instance 104). This parameter can provide information for uniquely identifying the selected in-network computation offload instance(s) 104 by server applications 108, which could include information indicating software and hardware aspects of the in-network computation offload instance 104.

In some embodiments, the server-specific computation offload information 516, in relation to modified reply packets 508, could include a service offload identifier (e.g., a name, type, description, and/or capabilities of the in-network computation offload instance 104). This parameter can provide information about the identity of the selected server-specific computation offload operations/tasks/functions. Considering that several server-specific computation offload operations/tasks could be deployed on the same in-network computation offload instance 104, this parameter can be used to identify each operation supported by the in-network computation offload instance 104.

In some embodiments, the server-specific computation offload information 516, in relation to modified reply packets 508, could include service offload metadata (e.g., one or more commands and data). This set of parameters can provide information to in-network computation offload instance(s) 104 on operations relative to the selected service offload functions. As server applications 108 decide to offload some portion of their workloads onto in-network computation offload instances 104, server applications 108 could indicate using these parameters specific tasks for the offload functions to perform. For example, a server application 108 can request an in-network computation offload instance 104 to perform (1) data provisioning and/or (2) service offload execution. In particular, with respect to data provisioning, when client applications 102 send request packets 502 to a server application 108, those request packets 502 can be answered by an in-network computation offload instance 104 on behalf of the server application 108. In the case where request packets 502 are answered only using information known by a server application 108, it is the responsibility of that server application 108 to provision this information in the in-network computation offload instance 104 so that the intended service offload functions can be executed as expected. For example, the flow identification process may require data provisioning for selecting the proper server-specific computation offload operation/task of the service offload function. Information related to Quality of Service (QoS) could also be specified (e.g., to provide offload services according to priorities and network traffic management rules). A time limit for caching the information within an in-network computation offload instance 104 could also be provided, after which request packets 502 would once again reach server applications 108 for processing.

With respect to service offload execution, when server applications 108 receive request packets 502 from client applications 102, as described herein, corresponding request operations must be performed by server applications 108 and reply messages 510 must be returned to client applications 102. A server application 108 may also desire to offload part of the requested operations to an in-network computation offload instance 104. In this case, the in-network computation offload instance 104 could provide instructions to an in-network computation offload instance 104, as part of the server-specific computation offload information 516 within the modified reply packet 508, to perform the requested operations (in some cases using provided request-specific information).

As described above, when a server application 108 receives a request packet 502 from a client application 102, the server application 108 can determine whether similar subsequent request packets 502 are to be answered by in-network computation offload instances 104 instead of by the server application 108 itself. Service offload placement logic within the server application 108 can leverage several pieces of information to make this offload placement decision. For example, proximity/distance information can be used to make offload placement decisions. In particular, for request packets 502, each in-network computation offload instance 104 adds the requested server-specific computation offload information 516 to request packets 502 in an ordered fashion (i.e., reflecting the order in which they are received by each in-network computation offload instance 104) to generate corresponding modified request packets 506. Using this information, the server application 108 can determine all the in-network computation offload instances 104 in the traffic path between the client application 102 and the server application 108, including the proximity of the in-network computation offload instances 104 from the client application 102 and the server application 108 (e.g., the closest in-network computation offload instance 104 to the client application 102 and the closest in-network computation offload instance 104 to the server application 108).

In some embodiments, latency and/or jitter information can be used to make offload placement decisions. In particular, for request packets 502, each in-network computation offload instance 104 can add a timestamp value (e.g., ingress timestamp and/or egress timestamp) as part of the server-specific computation offload information 516, which could be used by the server application 108 to estimate the latency characterizing each in-network computation offload instance 104. Similarly, a jitter value could also be determined by comparing the received latency information. Estimations of latency and/or jitter could be used to meet specific requirements that might be needed for certain client applications 102 and server applications 108.

In some embodiments, resource availability information can be used to make offload placement decisions. In particular, for request packets 502, each in-network computation offload instance 104 can add resource availability information as part of the server-specific computation offload information 516 to enable the server applications 108 to manage available resources more efficiently. For example, a server application 108 could decide to select a first in-network computation offload instance 104 instead of a second in-network computation offload instance 104 because of available resources or overall differences in performance characteristics.

In some embodiments, service offload analytics information can be used to make offload placement decisions. In particular, for request packets 502, each in-network computation offload instance 104 can add service offload analytics information as part of the server-specific computation offload information 516 for collection by server applications 108. Accordingly, server applications 108 could better determine which in-network computation offload instance 104 could be most beneficial for offload purposes. For example, the server application 108 could consider whether several in-network computation offload instances 104 across multiple ToR switches is preferred over a single in-network computation offload instance 104 on a spine switch.

In some embodiments, QoS information can be used to make offload placement decisions. In particular, for request packets 502, each in-network computation offload instance 104 can add QoS information as part of the server-specific computation offload information 516 to differentiate between request packets 502 from client applications 102 (e.g., in terms of priority, max latency, max jitter, bandwidth, etc.). Using QoS information for client applications 102 and server applications 108, the placement of operations using in-network computation offload instances 104 could be best evaluated by server applications 108. For example, assuming a server application 108 is used by client applications 102 that are latency sensitive, then selecting the closest in-network computation offload instance 104 would most likely be the best option.

Figure 10:
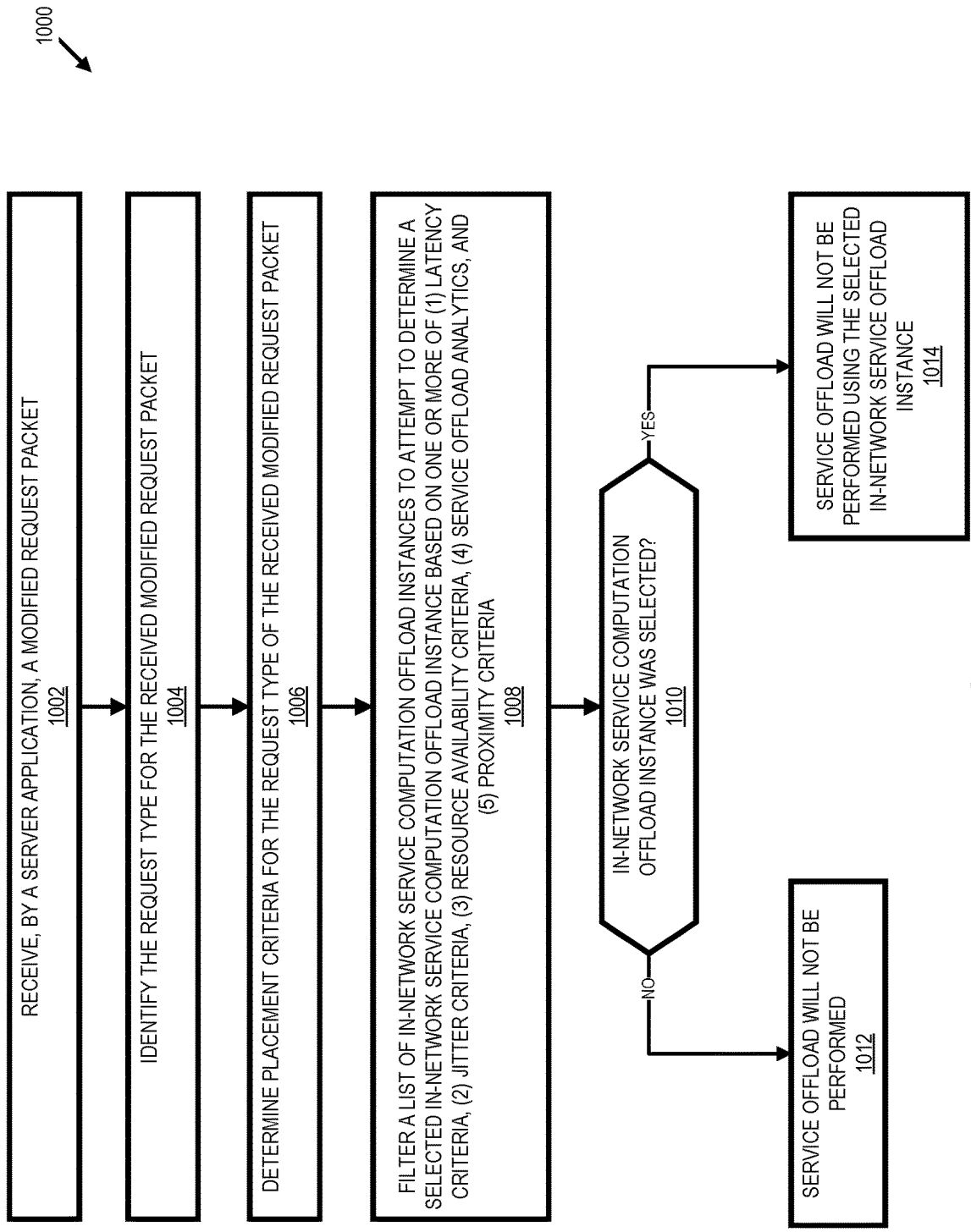
FIG. 10 shows a method for service offload placement logic, according to some embodiments.

An example method 1000 for service offload placement logic is shown in FIG. 10. The operations in the flow diagram of FIG. 10 will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagram of FIG. 10.

As shown in FIG. 10, a modified request packet 506 is received by a server application 108 at operation 1002 and a request type of the received modified request packet 506 is determined at operation 1004. As noted above, since each in-network service offload instance 104 added its service-specific offload information 516 to request packets 502 for generating modified request packets 506, an ordered list of all available in-network service offload instances 104 is available for offload placement purposes. Assuming different types of request packets 502 could be destined to a server application 108, placement criteria can be dependent on each modified request packet 506 type (as determined at operation 1004). The placement criteria, which is retrieved/determined at operation 1006, can be used to filter the list of in-network computation offload instances 104 to select the preferred in-network service offload instance(s) 104 that would be best suited to offload a workload of the server application 108. In this example, the list of in-network computation offload instances 104 can be filtered at operation 1008 based on one or more of (1) latency, (2) jitter, (3) resource availability, (4) service offload analytics, and (5) proximity of the in-network offload computation instance 104 from the requesting client application 102. For example, in one embodiment, the list of in-network computation offload instances 104 can be first filtered based on latency and jitter, then based on the resource availability on each in-network computation offload instance 104, then on service offload analytics, and finally based on the proximity of the in-network offload computation instance 104 from the requesting client application 102. If an in-network offload computation instance 104 can be successfully identified (as determined at operation 1010), this in-network offload computation instance 104 can be used for offload purposes at operation 1012. Otherwise, the request packets 502 could not be offloaded on any of the available in-network offload service instances 104 as indicated at operation 1014.

Figure 11:
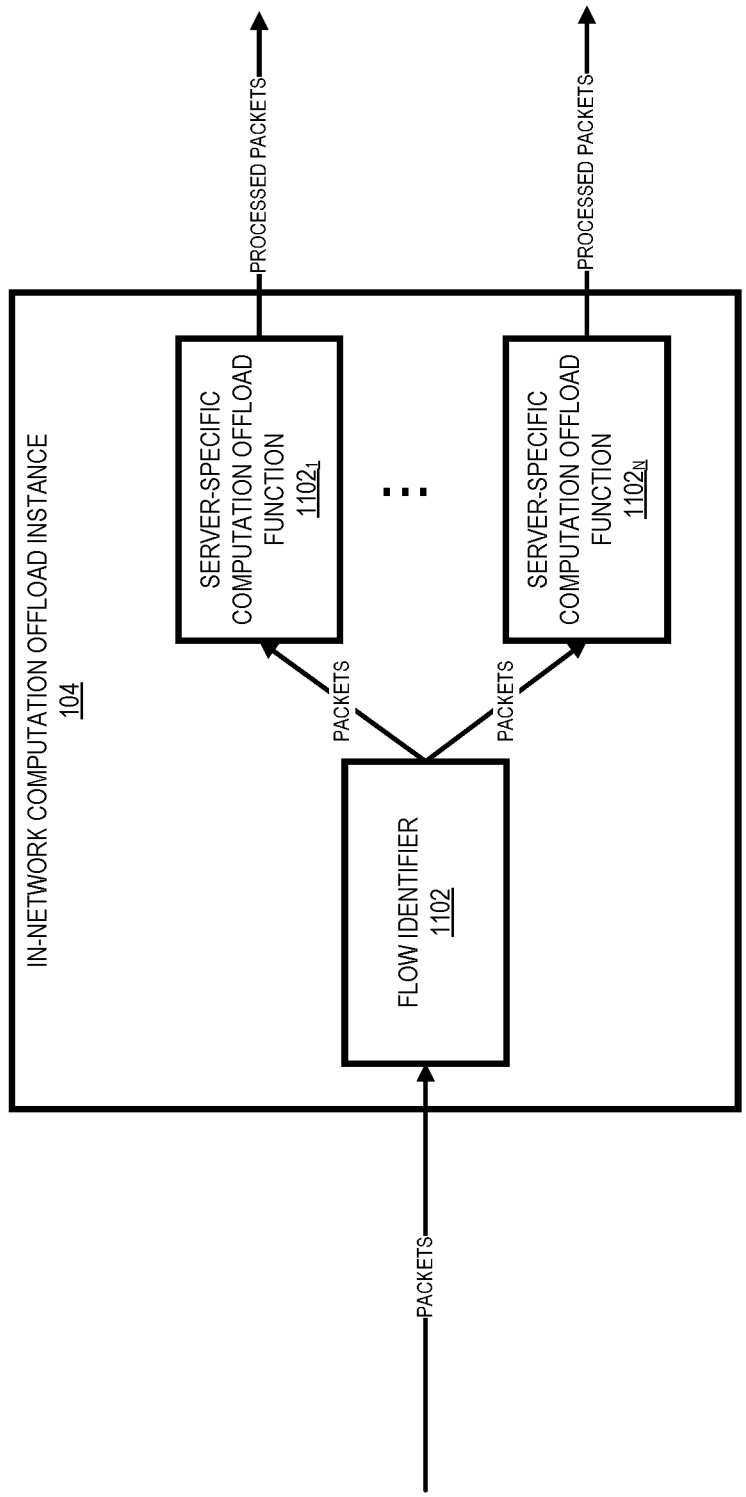
FIG. 11 shows a flow identification process, according to some embodiments.

When request packets 502 and modified reply packets 508 reach an in-network computation offload instance 104, a check is performed to verify their in-network computation offload eligibility. That check could be considered a filter of these packets 502 and 508 as only certain packets leverage in-network computation offload functions. As network traffic flows can be identified using information contained in packet headers, the check could include a flow identification process, which could potentially lead to the identification of a corresponding server-specific computation offload task/function, as shown in FIG. 11. In particular, the flow identifier 1102 of an in-network computation offload instance 104 receives packets (e.g., a request packet 502, a modified request packet 506, a reply packet 510, or a modified reply packet 508) and selects a corresponding server-specific computation offload function $1102_1$-$1102_N$ for the packets. The corresponding server-specific computation offload function $1102_1$-$1102_N$ processes the packets and transmits processed packets to a corresponding next in-network computation offload instance 104, server application 108, or client application 102.

For in-network computation offload eligibility purposes, flow identification could be performed, for example, using one or more pieces of information described below. For request packets 502/506, flow identification could be performed using an identifier of (1) an originating client application 102 (e.g., Ethernet, IP address, protocol, protocol ports, etc.) and/or (2) an identifier of a destination/target server application 108 (e.g., Ethernet, IP address, protocol, protocol ports, etc.). For reply packets 510/508, flow identification could be performed using an identifier of (1) an originating server application 108 (e.g., Ethernet, IP address, protocol, protocol ports, etc.) and/or (2) an identifier of a destination/target client application 102 (e.g., Ethernet, IP address, protocol, protocol ports, etc.). For each in-network computation offload instance 104, network traffic flows could be provisioned using multiple different mechanisms, or even a combination of mechanisms. These mechanisms include (1) static flow identification and (2) dynamic flow identification.

With respect to static flow identification, this reflects the use case in which traffic flows would have been statically configured for an in-network computation offload instance 104. For example, this could be because the network flows are hard-coded in the in-network computation offload instance 104, potentially based on well-known protocols and port numbers, or are provisioned at start-up using configuration files. With respect to dynamic flow identification, this reflects the use case in which traffic flows are provisioned dynamically in each in-network computation offload instance 104, according to the server-specific computation offload information provided by server applications 108 to in-network computation offload instances 104.

Following a similar concept, server applications 108 could also use network traffic flow identification for selecting whether in-network computation offload functions should be used. For example, it could be determined that only specific client applications 102 should be allowed to use offload services or only for requests using a specific level of priority.

As mentioned above, in some embodiments, statistics received within in-band request packets 502/506 can be leveraged by server applications 108 such that they can decide to offload their compute functions on the most suitable in-network computation offload instance 104. Thus, the selected in-network computation offload instance 104 can respond to client applications 102 on behalf of the corresponding server application 108. Once the selected in-network computation offload instance 104 starts to respond back to client applications 102, the server application 108 is no-longer involved in the traffic flow. Accordingly, it may be necessary to keep server applications 108 updated with the latest statistics (e.g., resources utilization, flow statistics, etc.) from the selected in-network computation offload instance 104 such that the server applications 108 can revoke, update, or migrate the offload computation to another suitable in-network computation offload instance 104 (along with the data if required).

As also mentioned above, a time limit for caching the server-specific offload information within an in-network computation offload instance 104 can be provided by server applications 108 to in-network computation offload instances 104. At the expiration of that time limit, new client request packets 502 would once again reach corresponding server applications 108 for processing. This includes the latest related statistics from in-network computation offload instances 104 being transmitted to server applications 108 with request packets 502 to validate whether the previously selected in-network computation offload instances 104 would still be the most appropriate device for offloading tasks of the server applications 108. Alternatively, at expiration of the timer, in-network computation offload instances 104 could also send their statistics to server applications 108 using unsolicited messages in addition to processing request packets 502 irrespective of a time limit.

In the case where server applications 108 would need to update or delete the information configured by in-network computation offload instances 104, server applications 108 could send unsolicited messages destined to in-network computation offload instances 104 to update or delete the information that was cached for offloading tasks of the server application 108.

In the cases of highly programmable networking devices, such as smart-NICs, Field Programmable Gate Arrays (FPGAs), and P4-based Ethernet switches, an in-network computation offload framework could be developed and supported on multiple different types of cloud networking devices. Similarly, several server-specific computation offload tasks could also be developed and deployed on the framework such that server applications 108 can offload some of their functions onto such devices.

Regarding server-specific computation offload information 516 to be carried within packets (e.g., modified request packets 506 and modified reply packets 508), there are a number of solutions that could be extended to provide the required functionality. For example, the P4 In-band Network Telemetry (INT) specification specifies the collection of network telemetry data from networking devices by the data plane and without requiring intervention or work by the control plane. This telemetry data is carried within real application network traffic. Further, in the INT architectural model, packets contain header fields that are interpreted as "telemetry instructions" by network devices. These instructions tell an INT-capable device what state to collect and write into the packet as it traverses the network. The specific location for INT headers is intentionally not specified (i.e., an INT header can be inserted as an option or payload of any encapsulation type). In some embodiments, the following choices are potential encapsulations for the INT header using common protocol stacks: (1) INT over VXLAN (as VXLAN payload, per GPE extension), (2) INT over Geneve (as Geneve option), (3) INT over NSH (as NSH payload), (4) INT over TCP (as payload), (5) INT over UDP (as payload), and (6) INT over GRE (as a shim between GRE header and encapsulated payload).

Based on the above, the INT framework could minimally be used to collect the following information as part of the server-specific computation offload information: (1) a switch id (i.e., the unique ID of a switch (generally administratively assigned, which are unique within an INT domain.), (2) an ingress timestamp (i.e., the device local time when the INT packet was received on the ingress physical or logical port), (3) an egress timestamp (i.e., the device local time when the INT packet was processed by the egress physical or logical port), and (4) hop latency (i.e., the time taken for the INT packet to be switched within the device).

In other embodiments, the Network Service Header (NSH) specification, as part of the Service Function Chaining (SFC) specification, could also be extended to carry all the parameters of the server-specific computation offload information.

Figure 12:
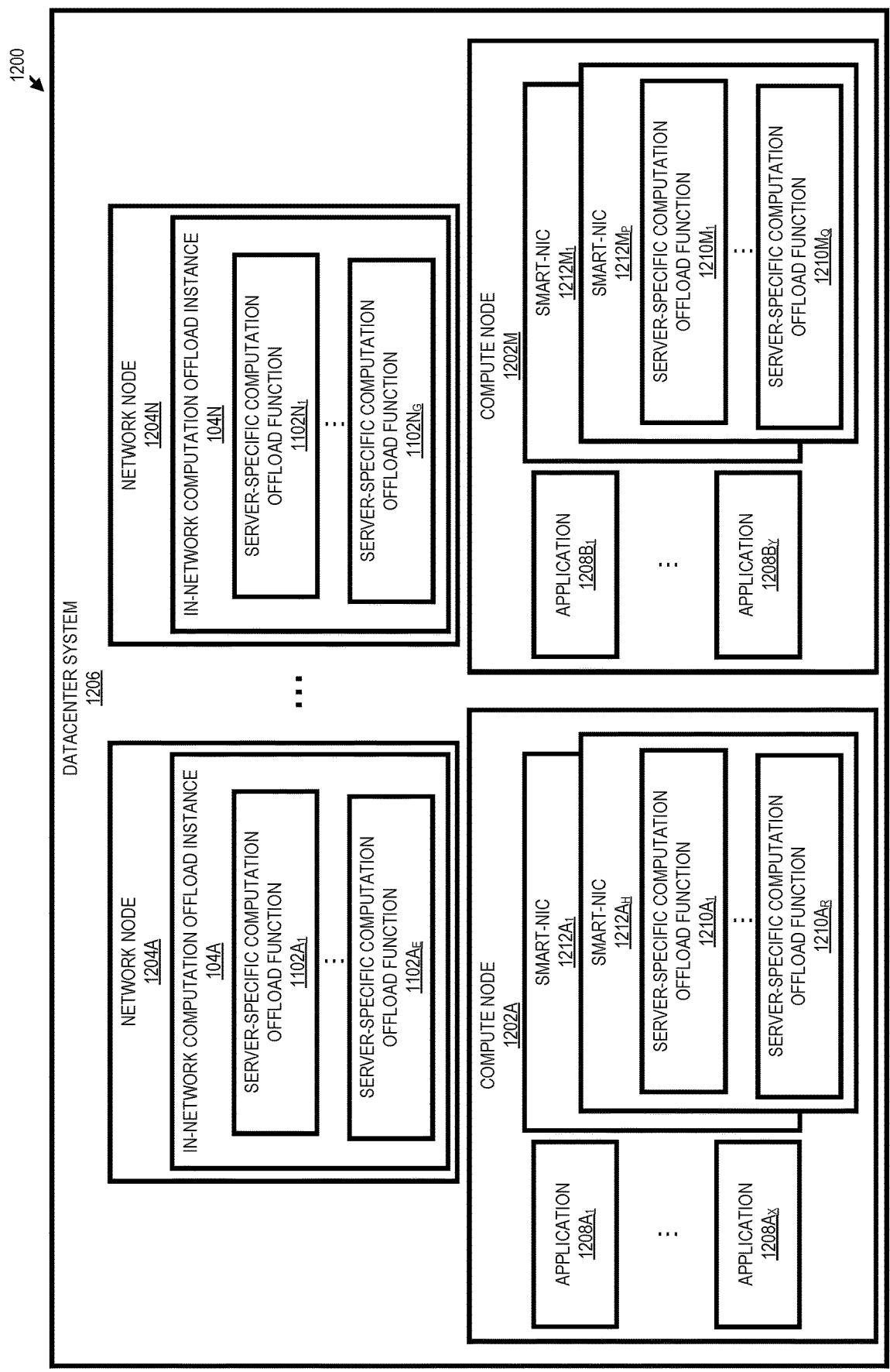
FIG. 12 shows a cloud infrastructure, according to some embodiments.

Turning to FIG. 12, a cloud infrastructure 1200 for use with the above systems and methods will be described. In the context of cloud systems, multiple compute nodes 1202A-1202M and network nodes 1204A-1204N can support the in-network computation offload framework described above, which could in turn provide support for several server-specific computation offload tasks/operations. In particular, the cloud infrastructure 1200 is shown in relation to a datacenter system 1206. When considering cloud deployments, the cloud infrastructure 1200 could provide offload services through in-network computation offload-as-a-service concept.

In such a scenario, the in-network computation offload-as-a-service functionality allows tenants of the cloud infrastructure 1200 to register server applications 108 for in-network computation offload capabilities. The cloud infrastructure 1200 can enable this functionality by adding specific network traffic flows across datacenter resources that supports the in-network computation offload framework. By enabling this functionality, server applications 108 could start receiving server-specific computation offload information 516 with the received request packets 502 and start offloading its processing workloads across the available resources.

As shown in FIG. 12, each compute node 1202 can support one or more applications 1208 (e.g., client applications 102 and/or server applications 108). For example, the compute node 1202A supports the applications $1208A_1$-$1208A_X$ and the compute node 1202M supports the applications $1208B_1$-$1208B_Y$. Similarly, each compute node 1202 can support one or more server-specific computation offload functions 1210, which are implemented within corresponding in-network computation offload instances 104. For example, the compute node 1202A can include a set of smart-NICs $1212A_1$-$1212A_H$ and each smart-NIC $1212A_1$-$1212A_H$ includes a set of set of server-specific computation offload functions 1210 (e.g., the smart-NIC $1212A_H$ includes the server-specific computation offload functions $1210A_1$-$1210A_R$). Similarly, the compute node 1202M can include a set of smart-NICs $1212M_1$-$1212M_P$ and each smart-NIC $1212M_1$-$1212M_P$ includes a set of set of server-specific computation offload functions 1210 (e.g., the smart-NIC $1212M_P$ includes the server-specific computation offload functions $1210M_1$-$1210M_Q$).

In some embodiments, the amount of resources that are allocated to each server-specific computation offload function 1202 can be dynamically controlled. For example, SLAs of tenants can be used to better control the overall resource usage of the cloud infrastructure 1200 as well as to provide an optimized environment that could meet requirements of applications 1208. Further, in some embodiments, the cloud infrastructure 1200 can allow traceability, logging, charging, rate limiting, other system architecture-related capabilities.

As described herein, a generic in-network computation offload framework is provided to allow server applications 108 to dynamically leverage supporting network devices to provide server-specific tasks/operations on their behalf. The supporting network devices are deployed along the network traffic paths interconnecting client applications 102 and server applications 108 and the framework allows for the selection of a server-specific in-network computation offload instances 104 based on a network traffic flow-based mechanism. When fully provisioned, an in-network computation offload instance 104 can answer request packets 502 on behalf of a server application 108. Otherwise, generic and server-specific in-network computation offload information is added to request packets destined to server applications 108. In particular, framework allows for generic in-network computation offload information (e.g., identities and timestamps) and server-specific in-network computation offload information (e.g., server-specific statistics) to be directly inserted and carried within request packets 502 destined to server applications 108 to provide in-band protocol signaling.

Based on received in-network computation offload information, the framework allows server applications 108 to dynamically provision their own in-network computation offload tasks using generic in-network computation offload information (e.g., instance 104 identities) and server-specific in-network computation offload information (e.g., task-specific configuration information), which is directly inserted and carried within modified reply packets 508 destined to client applications 102 to provide in-band protocol signaling.

Server applications 108 use the received generic and server-specific in-network computation offload information to select the most suitable location for offloading their server-specific packet processing workloads. The decision is based on in-network computation offload placement logic that bases placement decisions using one or more parameters (e.g., framework resources availability and characteristics, network topology, latency and jitter, client SLAs, server SLAs, and data analytics). When a server application 108 determines that it should leverage in-network computation offload capabilities, related server-specific in-network computation offload information 516 is added directly to reply packets 508 for the selected in-network computation offload instance 104 to provision the corresponding server-specific computation offload task accordingly.

To assure data coherency on in-network devices, server applications 108 can update and delete the information configured on each in-network computation offload instance 104 by using unsolicited messages destined to in-network functions. Also, a time limit for caching the information within an in-network computation offload instance 104 can be provided by server applications 108 to in-network functions.

Figure 13A:
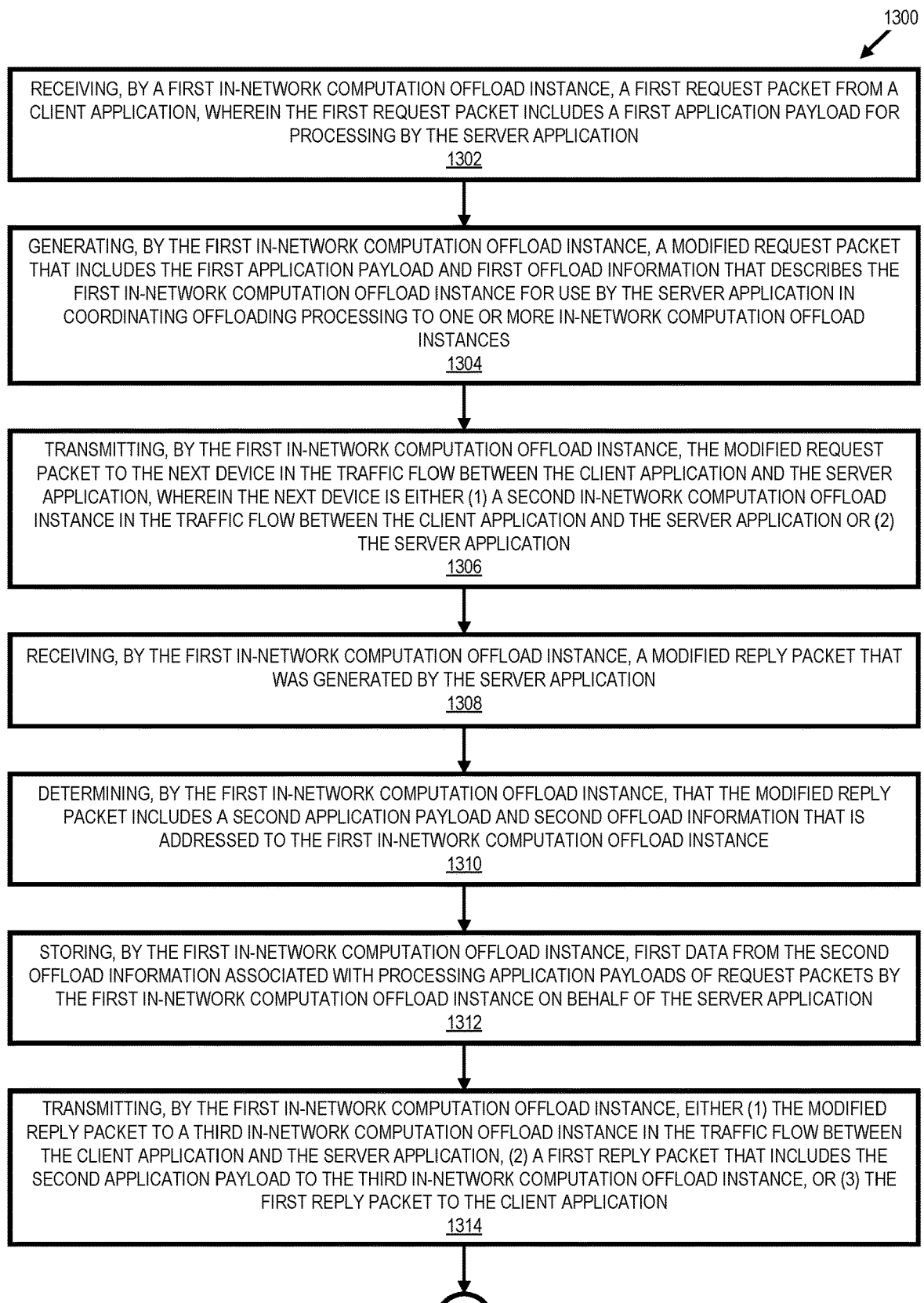
FIGS. 13A and 13B illustrate a method for offloading services of a server application in a network system, according to some embodiments of the invention.
Figure 13B:
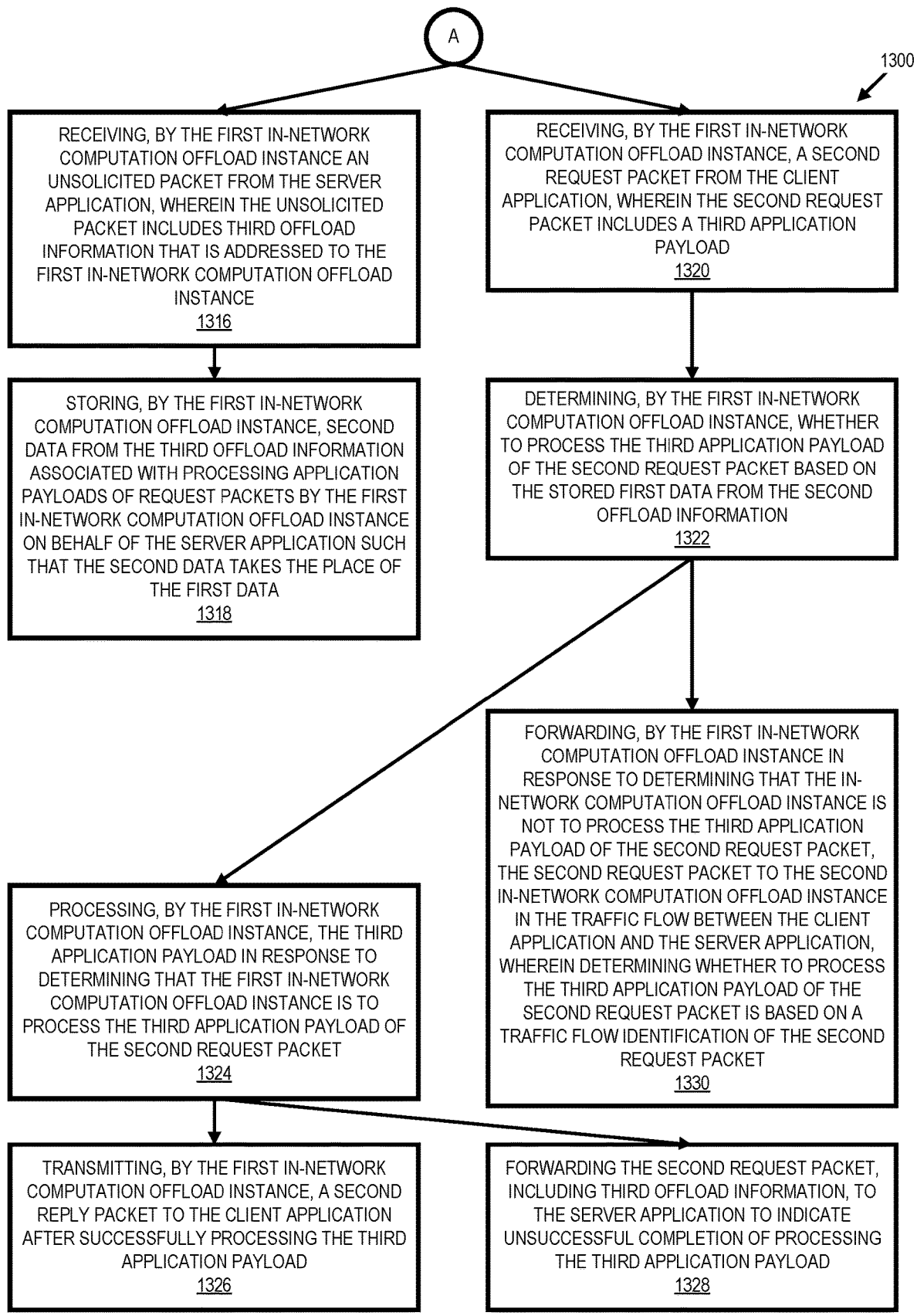

Turning now to FIGS. 13A-B, a method 1300 will be described for offloading services of a server application 108 in a network system 100. The operations in the flow diagram of FIGS. 13A-B will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagram of FIGS. 13A-B.

As shown in FIG. 13A, the method 1300 may commence at operation 1302 with a first in-network computation offload instance 104 receiving a first request packet 502 from a client application 102. In one embodiment, the first request packet 502 includes a first application payload 514 for processing by the server application 108.

At operation 1304, the first in-network computation offload instance 104 generates a modified request packet 506 that includes the first application payload 514 and first offload information 516 that describes the first in-network computation offload instance 104 for use by the server application 108 in coordinating offloading processing to one or more in-network computation offload instances 104. In one embodiment, the first offload information 516 includes one or more of (1) information describing the first in-network computation offload instance 104, including one or more of an identifier, capabilities, and the supported offload service functions of the first in-network computation offload instance 104, (2) allocated resources for the first in-network computation offload instance 104, (3) available resources for the first in-network computation offload instance 104, (4) one or more timestamps related to the request packet 502, (5) data analytics, and (6) server application offload specific information.

At operation 1306, the first in-network computation offload instance 104 transmits the modified request packet 506 to the next device in the traffic flow between the client application 102 and the server application 108. In one embodiment, the next device is either (1) a second in-network computation offload instance 104 in the traffic flow between the client application 102 and the server application 108 or (2) the server application 108.

At operation 1308, the first in-network computation offload instance 104 receives a modified reply packet 508 that was generated by the server application 108.

At operation 1310, the first in-network computation offload instance 104 determines that the modified reply packet 508 includes a second application payload 514 and second offload information 516 that is addressed to the first in-network computation offload instance 104. In one embodiment, the modified reply packet 508 is received from the second in-network computation offload instance 104 and was originally generated by the server application 108. Further, the second offload information 516 includes second data associated with processing application payloads 514 of request packets 502 by the first in-network computation offload instance 104 on behalf of the server application 108. In some embodiments, the second offload information 516 includes one or more of (1) information identifying the first in-network computation offload instance 104, (2) information identifying the second in-network computation offload instance 104, (3) a service, function, or operation identifier, (4) service offload metadata, and (5) instructions for processing request packets 502.

At operation 1312, by the first in-network computation offload instance 104 stores first data from the second offload information 516 associated with processing application payloads 514 of request packets 502 by the first in-network computation offload instance 104 on behalf of the server application 108.

At operation 1314, by the first in-network computation offload instance 104 transmits either (1) the modified reply packet 508 to a third in-network computation offload instance 104 in the traffic flow between the client application 102 and the server application 108, (2) a first reply packet 510 that includes the second application payload 514 to the third in-network computation offload instance 104, or (3) the first reply packet 510 to the client application 102.

At operation 1316, by the first in-network computation offload instance 104 receives an unsolicited packet from the server application 108. In one embodiment, the unsolicited packet includes third offload information 516 that is addressed to the first in-network computation offload instance 104.

At operation 1318, by the first in-network computation offload instance 104 stores second data from the third offload information 516 associated with processing application payloads 514 of request packets 502 by the first in-network computation offload instance 104 on behalf of the server application 108 such that the second data takes the place of the first data following expiration of the time limit. In one embodiment, wherein the second offload information 516 indicates a time limit for storing the first data from the second offload information 516 by the first in-network computation offload instance 104 and the unsolicited packet can be received from the server application 108 based on the expiration of the time limit.

At operation 1320, by the first in-network computation offload instance 104 receives a second request packet 502 from the client application 108 and the second request packet 502 includes a third application payload 514.

At operation 1322, by the first in-network computation offload instance 104 determines whether to process the third application payload 514 of the second request packet 502 based on the stored first data from the second offload information 516. In one embodiment, determining whether to process the third application payload 514 of the second request packet 502 is based on a traffic flow identification of the second request packet 502. Further, when the first in-network computation offload instance 104 determines to process the third application payload 514 of the second request packet 502, the traffic flow identification indicates which offload operation to be performed by the first in-network computation offload instance 104 for processing the third application payload 514 of the second request packet 502. Following operation 1322, the method 1300 may either move to operation 1324 or operation 1330.

At operation 1324, the first in-network computation offload instance 104 processes the third application payload 514 in response to determining that the first in-network computation offload instance 104 is to process the third application payload 514 of the second request packet 502. Following operation 1324, the method 1300 may either move to operation 1326 or operation 1328.

At operation 1326, the first in-network computation offload instance 104 transmits a second reply packet 510 to the client application 102 after successfully processing the third application payload 514.

At operation 1328, the first in-network computation offload instance 104 forwards the second request packet 502, including third offload information 516, to the server application 108 to indicate unsuccessful completion of processing the third application payload 514.

At operation 1330, the first in-network computation offload instance 104 forwards, in response to determining that the in-network computation offload instance 104 is not to process the third application payload 514 of the second request packet 502, the second request packet 504 to the second in-network computation offload instance 104 in the traffic flow between the client application 102 and the server application 108. In one embodiment, determining whether to process the third application payload 514 of the second request packet 502 is based on a traffic flow identification of the second request packet 502.

Figure 14:
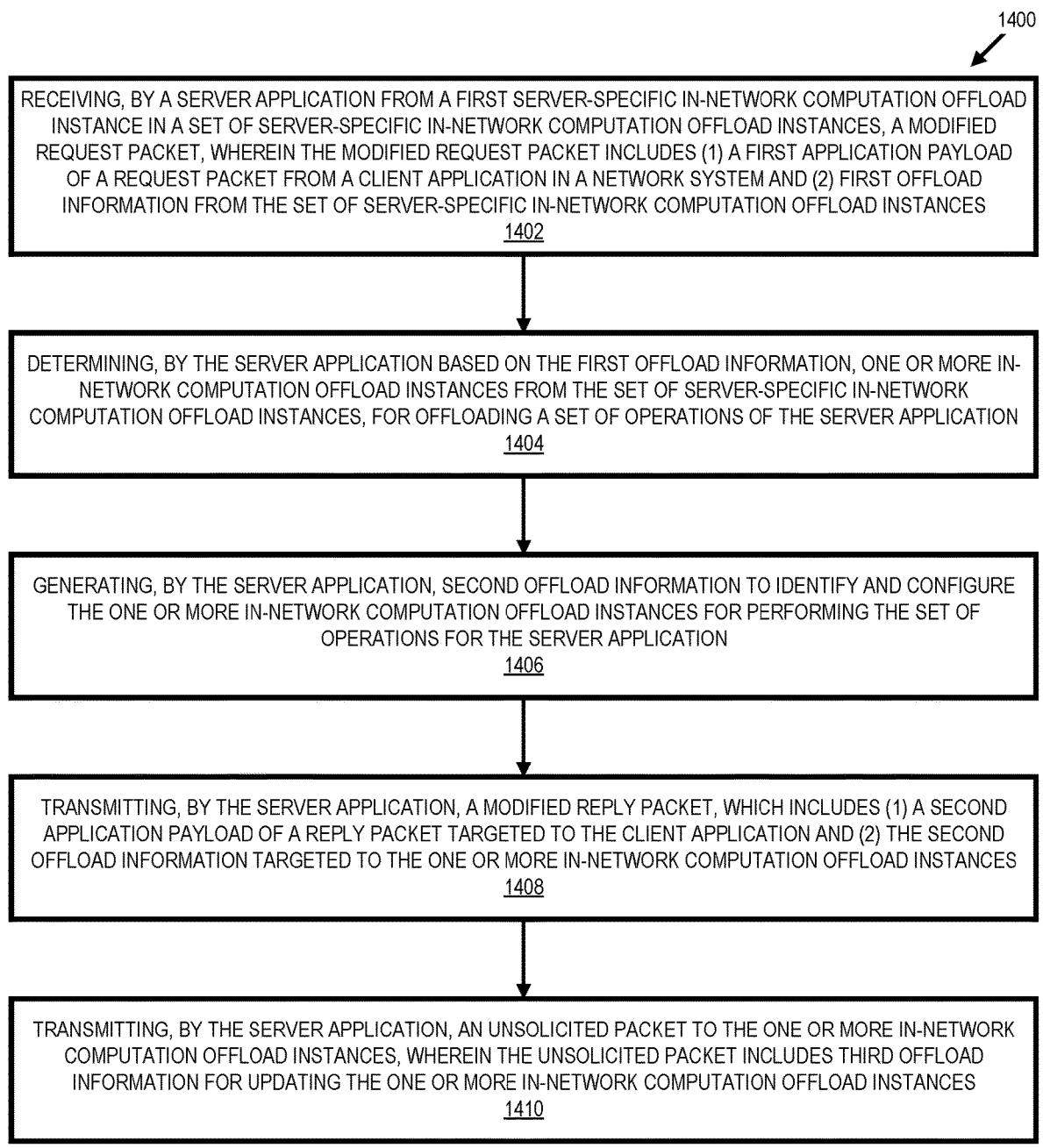
FIG. 14 shows a method for offloading services of a server application in a network system, according to some embodiments.

Turning now to FIG. 14, a method 1400 will be described for offloading services of a server application 108 in a network system 100. The operations in the flow diagram of FIG. 14 will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagram of FIG. 14.

As shown in FIG. 14, the method 1400 may commence at operation 1402 with the server application 109 receiving from a first server-specific in-network computation offload instance 104₁ in a set of server-specific in-network computation offload instances 104, a modified request packet 506. In one embodiment, the modified request packet 506 includes (1) a first application payload 514 of a request packet 502 from a client application 102 in the network system 100 and (2) first offload information 516 from the set of server-specific in-network computation offload instances 104.

At operation 1404, the server application 108 determines based on the first offload information 516, one or more in-network computation offload instances 104 from the set of server-specific in-network computation offload instances 104, for offloading a set of operations of the server application 108. In one embodiment, the set of server-specific in-network computation offload instances 104 operate on network devices along a traffic path between the client application 102 and the server application 108 and the first offload information 516 includes information provided by each server-specific in-network computation offload instance 104 in the set of server-specific in-network computation offload instances 104. In one embodiment, the first offload information 516 includes one or more of (1) information describing each server-specific in-network computation offload instance 104 in the set of server-specific in-network computation offload instances 104, including one or more of an identifier, capabilities, and the supported offload service functions of each server-specific in-network computation offload instance 104 in the set of server-specific in-network computation offload instances 104, (2) allocated resources for each server-specific in-network computation offload instance 104 in the set of server-specific in-network computation offload instances 104, (3) available resources for each server-specific in-network computation offload instance 104 in the set of server-specific in-network computation offload instances 104, (4) one or more timestamps related to the request packet 502, (5) data analytics, and (6) server application offload specific information. In one embodiment, the first offload information 516 includes information for each server-specific in-network computation offload instance 104 in the set of server-specific in-network computation offload instances 104 in the order the request packet 502 was received by the set of server-specific in-network computation offload instances 104. In one embodiment, the server application 108 selects the one or more in-network computation offload instances 104 such that the one or more in-network computation offload instances 104 are selected to minimize a distance from the client application 102. In one embodiment, upon receipt of a request packet 502 from the client application 102 by a first in-network computation offload instance 104 in the one or more in-network computation offload instances 104, the first in-network computation offload instance 104 is to process the request packet 502 according to the logic configured according to the second offload information 516. In some embodiments, processing the request packet 502 by the first in-network computation offload instance 104 includes processing a third application payload 514 of the request packet 502 and either (1) forwarding the processed third application payload 514 to a second in-network computation offload instance 104 in the one or more in-network computation offload instances 104 or (2) transmitting a reply packet 510 to the client application 102.

In some embodiments, determining by the server application 108 based on the first offload information 516, one or more in-network computation offload instances 104 for offloading the set of operations of the server application 108 includes: identifying, by the server application 108, a request type for the modified request packet 506; determining, by the server application 108, placement criteria for the request type of the modified request packet 506; and filtering, by the server application 108, the set of server-specific in-network computation offload instances 104 to select the one or more in-network computation offload instances 104 based on one or more of (1) latency criteria, (2) jitter criteria, (3) resource availability criteria, (4) service offload analytics, and (5) proximity criteria.

At operation 1406, the server application 108 generates second offload information 516 to identify and configure the one or more in-network computation offload instances 104 for performing the set of operations for the server application 108.

At operation 1408, the server application 108 transmits a modified reply packet 508, which includes (1) a second application payload 514 of a reply packet 510 targeted to the client application 102 and (2) the second offload information 516 targeted to the one or more in-network computation offload instances 104.

At operation 1410, the server application 108 transmits an unsolicited packet to the one or more in-network computation offload instances 104. In one embodiment, the unsolicited packet includes third offload information 516 for updating the one or more in-network computation offload instances 104. In some embodiments, the second offload information 516 includes a time limit for storing data of the first offload information 516 by the one or more in-network computation offload instances 104 and transmitting the unsolicited packet to the one or more in-network computation offload instances 104 is performed in response to expiration of the time limit.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 15A illustrates connectivity between network devices (NDs) within an exemplary network, as well as three exemplary implementations of the NDs, according to some embodiments of the invention. FIG. 15A shows NDs 1500A-H, and their connectivity by way of lines between 1500A-1500B, 1500B-1500C, 1500C-1500D, 1500D-1500E, 1500E-1500F, 1500F-1500G, and 1500A-1500G, as well as between 1500H and each of 1500A, 1500C, 1500D, and 1500G. These NDs are physical devices, and the connectivity between these NDs can be wireless or wired (often referred to as a link). An additional line extending from NDs 1500A, 1500E, and 1500F illustrates that these NDs act as ingress and egress points for the network (and thus, these NDs are sometimes referred to as edge NDs; while the other NDs may be called core NDs).

Two of the exemplary ND implementations in FIG. 15A are: 1) a special-purpose network device 1502 that uses custom application—specific integrated—circuits (ASICs) and a special-purpose operating system (OS); and 2) a general purpose network device 1504 that uses common off-the-shelf (COTS) processors and a standard OS.

The special-purpose network device 1502 includes networking hardware 1510 comprising a set of one or more processor(s) 1512, forwarding resource(s) 1514 (which typically include one or more ASICs and/or network processors), and physical network interfaces (NIs) 1516 (through which network connections are made, such as those shown by the connectivity between NDs 1500A-H), as well as non-transitory machine readable storage media 1518 having stored therein networking software 1520. During operation, the networking software 1520 may be executed by the networking hardware 1510 to instantiate a set of one or more networking software instance(s) 1522. Each of the networking software instance(s) 1522, and that part of the networking hardware 1510 that executes that network software instance (be it hardware dedicated to that networking software instance and/or time slices of hardware temporally shared by that networking software instance with others of the networking software instance(s) 1522), form a separate virtual network element 1530A-R. Each of the virtual network element(s) (VNEs) 1530A-R includes a control communication and configuration module 1532A-R (sometimes referred to as a local control module or control communication module) and forwarding table(s) 1534A-R, such that a given virtual network element (e.g., 1530A) includes the control communication and configuration module (e.g., 1532A), a set of one or more forwarding table(s) (e.g., 1534A), and that portion of the networking hardware 1510 that executes the virtual network element (e.g., 1530A).

The special-purpose network device 1502 is often physically and/or logically considered to include: 1) a ND control plane 1524 (sometimes referred to as a control plane) comprising the processor(s) 1512 that execute the control communication and configuration module(s) 1532A-R; and 2) a ND forwarding plane 1526 (sometimes referred to as a forwarding plane, a data plane, or a media plane) comprising the forwarding resource(s) 1514 that utilize the forwarding table(s) 1534A-R and the physical NIs 1516. By way of example, where the ND is a router (or is implementing routing functionality), the ND control plane 1524 (the processor(s) 1512 executing the control communication and configuration module(s) 1532A-R) is typically responsible for participating in controlling how data (e.g., packets) is to be routed (e.g., the next hop for the data and the outgoing physical NI for that data) and storing that routing information in the forwarding table(s) 1534A-R, and the ND forwarding plane 1526 is responsible for receiving that data on the physical NIs 1516 and forwarding that data out the appropriate ones of the physical NIs 1516 based on the forwarding table(s) 1534A-R.

FIG. 15B illustrates an exemplary way to implement the special-purpose network device 1502 according to some embodiments of the invention. FIG. 15B shows a special-purpose network device including cards 1538 (typically hot pluggable). While in some embodiments the cards 1538 are of two types (one or more that operate as the ND forwarding plane 1526 (sometimes called line cards), and one or more that operate to implement the ND control plane 1524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1536 (e.g., a first full mesh coupling the line cards and a second full mesh coupling all of the cards).

Returning to FIG. 15A, the general purpose network device 1504 includes hardware 1540 comprising a set of one or more processor(s) 1542 (which are often COTS processors) and physical NIs 1546, as well as non-transitory machine readable storage media 1548 having stored therein software 1550, a client application 102, a server application 108, and/or an offload instance 104. During operation, the processor(s) 1542 execute the software 1550 to instantiate one or more sets of one or more applications 1564A-R. While one embodiment does not implement virtualization, alternative embodiments may use different forms of virtualization. For example, in one such alternative embodiment the virtualization layer 1554 represents the kernel of an operating system (or a shim executing on a base operating system) that allows for the creation of multiple instances 1562A-R called software containers that may each be used to execute one (or more) of the sets of applications 1564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1554 represents a hypervisor (sometimes referred to as a virtual machine monitor (VMM)) or a hypervisor executing on top of a host operating system, and each of the sets of applications 1564A-R is run on top of a guest operating system within an instance 1562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1540, directly on a hypervisor (in which case the unikernel is sometimes described as running within a LibOS virtual machine), or in a software container, embodiments can be implemented fully with unikernels running directly on a hypervisor represented by virtualization layer 1554, unikernels running within software containers represented by instances 1562A-R, or as a combination of unikernels and the above-described techniques (e.g., unikernels and virtual machines both run directly on a hypervisor, unikernels and sets of applications that are run in different software containers).

The instantiation of the one or more sets of one or more applications 1564A-R, as well as virtualization if implemented, are collectively referred to as software instance(s) 1552. Each set of applications 1564A-R, corresponding virtualization construct (e.g., instance 1562A-R) if implemented, and that part of the hardware 1540 that executes them (be it hardware dedicated to that execution and/or time slices of hardware temporally shared), forms a separate virtual network element(s) 1560A-R.

The virtual network element(s) 1560A-R perform similar functionality to the virtual network element(s) 1530A-R— e.g., similar to the control communication and configuration module(s) 1532A and forwarding table(s) 1534A (this virtualization of the hardware 1540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1562A-R corresponding to one VNE 1560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1562A-R to VNEs also apply to embodiments where such a finer level of granularity and/or unikernels are used.

In certain embodiments, the virtualization layer 1554 includes a virtual switch that provides similar forwarding services as a physical Ethernet switch. Specifically, this virtual switch forwards traffic between instances 1562A-R and the physical NI(s) 1546, as well as optionally between the instances 1562A-R; in addition, this virtual switch may enforce network isolation between the VNEs 1560A-R that by policy are not permitted to communicate with each other (e.g., by honoring virtual local area networks (VLANs)).

The third exemplary ND implementation in FIG. 15A is a hybrid network device 1506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1502) could provide for para-virtualization to the networking hardware present in the hybrid network device 1506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1530A-R, VNEs 1560A-R, and those in the hybrid network device 1506) receives data on the physical NIs (e.g., 1516, 1546) and forwards that data out the appropriate ones of the physical NIs (e.g., 1516, 1546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

FIG. 15C illustrates various exemplary ways in which VNEs may be coupled according to some embodiments of the invention. FIG. 15C shows VNEs 1570A.1-1570A.P (and optionally VNEs 1570A.Q-1570A.R) implemented in ND 1500A and VNE 1570H.1 in ND 1500H. In FIG. 15C, VNEs 1570A.1-P are separate from each other in the sense that they can receive packets from outside ND 1500A and forward packets outside of ND 1500A; VNE 1570A.1 is coupled with VNE 1570H.1, and thus they communicate packets between their respective NDs; VNE 1570A.2-1570A.3 may optionally forward packets between themselves without forwarding them outside of the ND 1500A; and VNE 1570A.P may optionally be the first in a chain of VNEs that includes VNE 1570A.Q followed by VNE 1570A.R (this is sometimes referred to as dynamic service chaining, where each of the VNEs in the series of VNEs provides a different service—e.g., one or more layer 4-7 network services). While FIG. 15C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 15A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 15A may also host one or more such servers (e.g., in the case of the general purpose network device 1504, one or more of the software instances 1562A-R may operate as servers; the same would be true for the hybrid network device 1506; in the case of the special-purpose network device 1502, one or more such servers could also be run on a virtualization layer executed by the processor(s) 1512); in which case the servers are said to be co-located with the VNEs of that ND.

A virtual network is a logical abstraction of a physical network (such as that in FIG. 15A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 15D illustrates a network with a single network element on each of the NDs of FIG. 15A, and within this straight forward approach contrasts a traditional distributed approach (commonly used by traditional routers) with a centralized approach for maintaining reachability and forwarding information (also called network control), according to some embodiments of the invention. Specifically, FIG. 15D illustrates network elements (NEs) 1570A-H with the same connectivity as the NDs 1500A-H of FIG. 15A.

FIG. 15D illustrates that the distributed approach 1572 distributes responsibility for generating the reachability and forwarding information across the NEs 1570A-H; in other words, the process of neighbor discovery and topology discovery is distributed.

For example, where the special-purpose network device 1502 is used, the control communication and configuration module(s) 1532A-R of the ND control plane 1524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1570A-H (e.g., the processor(s) 1512 executing the control communication and configuration module(s) 1532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1524.

The ND control plane 1524 programs the ND forwarding plane 1526 with information (e.g., adjacency and route information) based on the routing structure(s). For example, the ND control plane 1524 programs the adjacency and route information into one or more forwarding table(s) 1534A-R (e.g., Forwarding Information Base (FIB), Label Forwarding Information Base (LFIB), and one or more adjacency structures) on the ND forwarding plane 1526. For layer 2 forwarding, the ND can store one or more bridging tables that are used to forward data based on the layer 2 information in that data. While the above example uses the special-purpose network device 1502, the same distributed approach 1572 can be implemented on the general purpose network device 1504 and the hybrid network device 1506.

FIG. 15D illustrates that a centralized approach 1574 (also known as software defined networking (SDN)) that decouples the system that makes decisions about where traffic is sent from the underlying systems that forwards traffic to the selected destination. The illustrated centralized approach 1574 has the responsibility for the generation of reachability and forwarding information in a centralized control plane 1576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1576 has a south bound interface 1582 with a data plane 1580 (sometime referred to the infrastructure layer, network forwarding plane, or forwarding plane (which should not be confused with a ND forwarding plane)) that includes the NEs 1570A-H (sometimes referred to as switches, forwarding elements, data plane elements, or nodes). The centralized control plane 1576 includes a network controller 1578, which includes a centralized reachability and forwarding information module 1579 that determines the reachability within the network and distributes the forwarding information to the NEs 1570A-H of the data plane 1580 over the south bound interface 1582 (which may use the OpenFlow protocol) and/or a client application 102, a server application 108, and/or an offload instance 104. Thus, the network intelligence is centralized in the centralized control plane 1576 executing on electronic devices that are typically separate from the NDs.

For example, where the special-purpose network device 1502 is used in the data plane 1580, each of the control communication and configuration module(s) 1532A-R of the ND control plane 1524 typically include a control agent that provides the VNE side of the south bound interface 1582. In this case, the ND control plane 1524 (the processor(s) 1512 executing the control communication and configuration module(s) 1532A-R) performs its responsibility for participating in controlling how data (e.g., packets) is to be routed (e.g., the next hop for the data and the outgoing physical NI for that data) through the control agent communicating with the centralized control plane 1576 to receive the forwarding information (and in some cases, the reachability information) from the centralized reachability and forwarding information module 1579 (it should be understood that in some embodiments of the invention, the control communication and configuration module(s) 1532A-R, in addition to communicating with the centralized control plane 1576, may also play some role in determining reachability and/or calculating forwarding information—albeit less so than in the case of a distributed approach; such embodiments are generally considered to fall under the centralized approach 1574, but may also be considered a hybrid approach).

While the above example uses the special-purpose network device 1502, the same centralized approach 1574 can be implemented with the general purpose network device 1504 (e.g., each of the VNE 1560A-R performs its responsibility for controlling how data (e.g., packets) is to be routed (e.g., the next hop for the data and the outgoing physical NI for that data) by communicating with the centralized control plane 1576 to receive the forwarding information (and in some cases, the reachability information) from the centralized reachability and forwarding information module 1579; it should be understood that in some embodiments of the invention, the VNEs 1560A-R, in addition to communicating with the centralized control plane 1576, may also play some role in determining reachability and/or calculating forwarding information—albeit less so than in the case of a distributed approach) and the hybrid network device 1506. In fact, the use of SDN techniques can enhance the NFV techniques typically used in the general purpose network device 1504 or hybrid network device 1506 implementations as NFV is able to support SDN by providing an infrastructure upon which the SDN software can be run, and NFV and SDN both aim to make use of commodity server hardware and physical switches.

FIG. 15D also shows that the centralized control plane 1576 has a north bound interface 1584 to an application layer 1586, in which resides application(s) 1588. The centralized control plane 1576 has the ability to form virtual networks 1592 (sometimes referred to as a logical forwarding plane, network services, or overlay networks (with the NEs 1570A-H of the data plane 1580 being the underlay network)) for the application(s) 1588. Thus, the centralized control plane 1576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 15D shows the distributed approach 1572 separate from the centralized approach 1574, the effort of network control may be distributed differently or the two combined in certain embodiments of the invention. For example: 1) embodiments may generally use the centralized approach (SDN) 1574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1574, but may also be considered a hybrid approach.

While FIG. 15D illustrates the simple case where each of the NDs 1500A-H implements a single NE 1570A-H, it should be understood that the network control approaches described with reference to FIG. 15D also work for networks where one or more of the NDs 1500A-H implement multiple VNEs (e.g., VNEs 1530A-R, VNEs 1560A-R, those in the hybrid network device 1506). Alternatively or in addition, the network controller 1578 may also emulate the implementation of multiple VNEs in a single ND. Specifically, instead of (or in addition to) implementing multiple VNEs in a single ND, the network controller 1578 may present the implementation of a VNE/NE in a single ND as multiple VNEs in the virtual networks 1592 (all in the same one of the virtual network(s) 1592, each in different ones of the virtual network(s) 1592, or some combination). For example, the network controller 1578 may cause an ND to implement a single VNE (a NE) in the underlay network, and then logically divide up the resources of that NE within the centralized control plane 1576 to present different VNEs in the virtual network(s) 1592 (where these different VNEs in the overlay networks are sharing the resources of the single VNE/NE implementation on the ND in the underlay network).

On the other hand, FIGS. 15E and 15F respectively illustrate exemplary abstractions of NEs and VNEs that the network controller 1578 may present as part of different ones of the virtual networks 1592. FIG. 15E illustrates the simple case of where each of the NDs 1500A-H implements a single NE 1570A-H (see FIG. 15D), but the centralized control plane 1576 has abstracted multiple of the NEs in different NDs (the NEs 1570A-C and G-H) into (to represent) a single NE 1570I in one of the virtual network(s) 1592 of FIG. 15D, according to some embodiments of the invention. FIG. 15E shows that in this virtual network, the NE 1570I is coupled to NE 1570D and 1570F, which are both still coupled to NE 1570E.

FIG. 15F illustrates a case where multiple VNEs (VNE 1570A.1 and VNE 1570H.1) are implemented on different NDs (ND 1500A and ND 1500H) and are coupled to each other, and where the centralized control plane 1576 has abstracted these multiple VNEs such that they appear as a single VNE 1570T within one of the virtual networks 1592 of FIG. 15D, according to some embodiments of the invention. Thus, the abstraction of a NE or VNE can span multiple NDs.

While some embodiments of the invention implement the centralized control plane 1576 as a single entity (e.g., a single instance of software miming on a single electronic device), alternative embodiments may spread the functionality across multiple entities for redundancy and/or scalability purposes (e.g., multiple instances of software running on different electronic devices).

Figure 16:
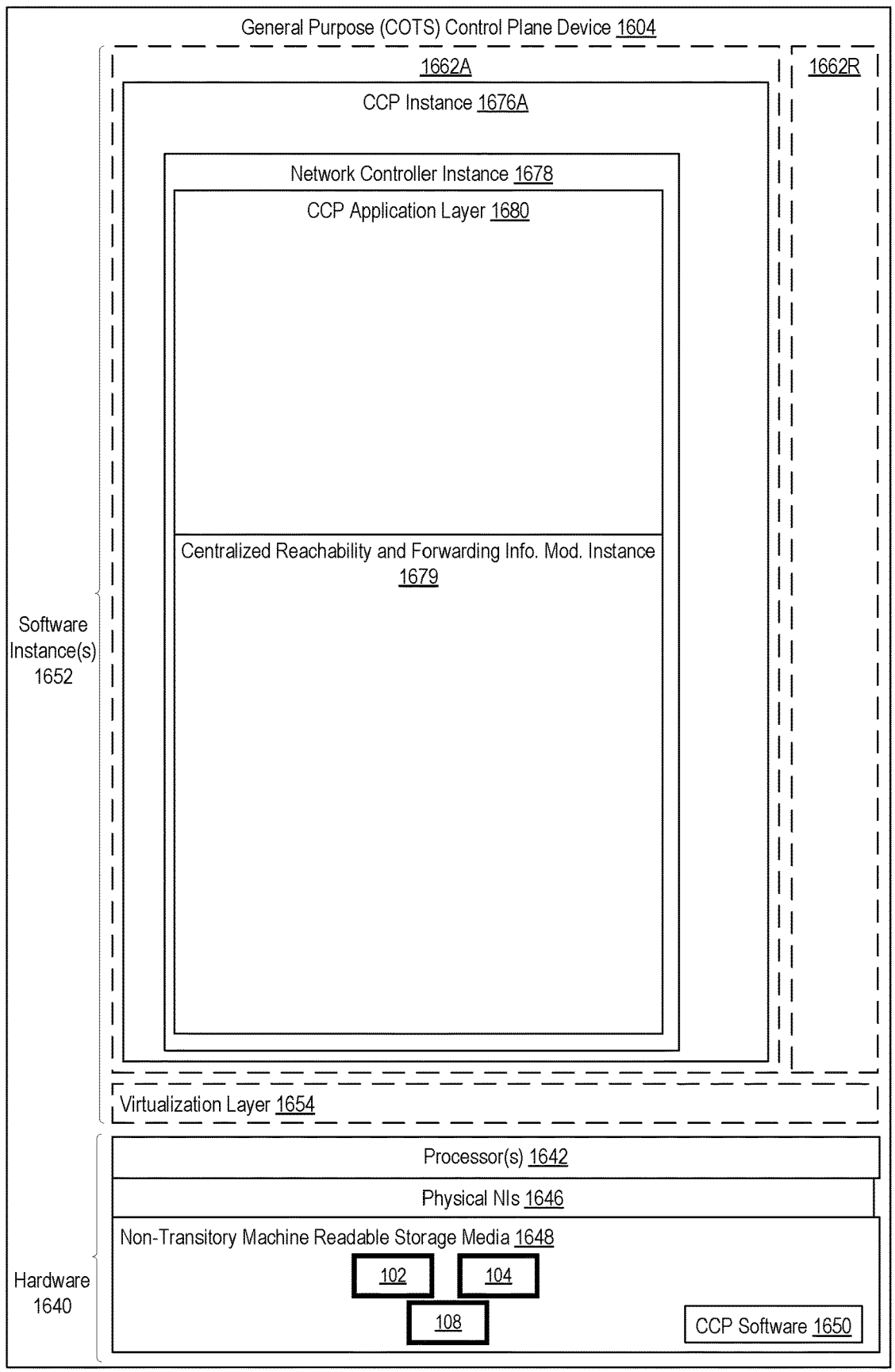
FIG. 16 illustrates a general-purpose control plane device with centralized control plane (CCP) software, according to some embodiments of the invention.

Similar to the network device implementations, the electronic device(s) running the centralized control plane 1576, and thus the network controller 1578 including the centralized reachability and forwarding information module 1579, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 16 illustrates, a general-purpose control plane device 1604 including hardware 1640 comprising a set of one or more processor(s) 1642 (which are often COTS processors) and physical NIs 1646, as well as non-transitory machine readable storage media 1648 having stored therein centralized control plane (CCP) software 1650 and/or a client application 102, a server application 108, and/or an offload instance 104.

In embodiments that use compute virtualization, the processor(s) 1642 typically execute software to instantiate a virtualization layer 1654 (e.g., in one embodiment the virtualization layer 1654 represents the kernel of an operating system (or a shim executing on a base operating system) that allows for the creation of multiple instances 1662A-R called software containers (representing separate user spaces and also called virtualization engines, virtual private servers, or jails) that may each be used to execute a set of one or more applications; in another embodiment the virtualization layer 1654 represents a hypervisor (sometimes referred to as a virtual machine monitor (VMM)) or a hypervisor executing on top of a host operating system, and an application is run on top of a guest operating system within an instance 1662A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1640, directly on a hypervisor represented by virtualization layer 1654 (in which case the unikernel is sometimes described as running within a LibOS virtual machine), or in a software container represented by one of instances 1662A-R). Again, in embodiments where compute virtualization is used, during operation an instance of the CCP software 1650 (illustrated as CCP instance 1676A) is executed (e.g., within the instance 1662A) on the virtualization layer 1654. In embodiments where compute virtualization is not used, the CCP instance 1676A is executed, as a unikernel or on top of a host operating system, on the "bare metal" general purpose control plane device 1604. The instantiation of the CCP instance 1676A, as well as the virtualization layer 1654 and instances 1662A-R if implemented, are collectively referred to as software instance(s) 1652.

In some embodiments, the CCP instance 1676A includes a network controller instance 1678. The network controller instance 1678 includes a centralized reachability and forwarding information module instance 1679 (which is a middleware layer providing the context of the network controller 1578 to the operating system and communicating with the various NEs), and an CCP application layer 1680 (sometimes referred to as an application layer) over the middleware layer (providing the intelligence required for various network operations such as protocols, network situational awareness, and user—interfaces). At a more abstract level, this CCP application layer 1680 within the centralized control plane 1576 works with virtual network view(s) (logical view(s) of the network) and the middleware layer provides the conversion from the virtual networks to the physical view.

The centralized control plane 1576 transmits relevant messages to the data plane 1580 based on CCP application layer 1680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1580 may receive different messages, and thus different forwarding information. The data plane 1580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets.

The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1580, the packet (or a subset of the packet header and content) is typically forwarded to the centralized control plane 1576. The centralized control plane 1576 will then program forwarding table entries into the data plane 1580 to accommodate packets belonging to the flow of the unknown packet. Once a specific forwarding table entry has been programmed into the data plane 1580 by the centralized control plane 1576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for offloading services of a server application in a network system, the method comprising:
    receiving, by a first in-network computation offload instance, a first request packet from a client application, wherein the first request packet includes a first application payload for processing by the server application;
    generating, by the first in-network computation offload instance, a modified request packet that includes the first application payload and first offload information that describes the first in-network computation offload instance for use by the server application in coordinating offloading processing to one or more in-network computation offload instances;
    transmitting, by the first in-network computation offload instance, the modified request packet to either (1) a second in-network computation offload instance in the traffic flow between the client application and the server application or (2) the server application;
    receiving, by the first in-network computation offload instance, a modified reply packet that was generated by the server application;
    determining, by the first in-network computation offload instance, that the modified reply packet includes a second application payload and second offload information that is addressed to the first in-network computation offload instance; and
    transmitting, by the first in-network computation offload instance, (1) the modified reply packet to a third in-network computation offload instance in the traffic flow between the client application and the server application, (2) a first reply packet that includes the second application payload to the third in-network computation offload instance, or (3) the first reply packet to the client application.

2. The method of claim 1, wherein the first offload information includes one or more of (1) information describing the first in-network computation offload instance, including one or more of an identifier, capabilities, and supported offload service functions of the first in-network computation offload instance, (2) allocated resources for the first in-network computation offload instance, (3) available resources for the first in-network computation offload instance, (4) one or more timestamps related to the request packet, (5) data analytics, and (6) server application offload specific information.

3. The method of claim 1, further comprising:
    storing, by the first in-network computation offload instance, first data from the second offload information associated with processing application payloads of request packets by the first in-network computation offload instance on behalf of the server application.

4. The method of claim 3, further comprising:
    receiving, by the first in-network computation offload instance, an unsolicited packet from the server application, wherein the unsolicited packet includes third offload information that is addressed to the first in-network computation offload instance; and
    storing, by the first in-network computation offload instance, second data from the third offload information associated with processing application payloads of request packets by the first in-network computation offload instance on behalf of the server application such that the second data takes place of the first data.

5. The method of claim 4, wherein the second offload information indicates a time limit for storing the first data from the second offload information by the first in-network computation offload instance and wherein the unsolicited packet is received from the server application based on expiration of the time limit.

6. The method of claim 1, wherein the modified reply packet is received from the second in-network computation offload instance and was originally generated by the server application and wherein the second offload information includes second data associated with processing application payloads of request packets by the first in-network computation offload instance on behalf of the server application.

7. The method of claim 1, wherein the second offload information includes one or more of (1) information identifying the first in-network computation offload instance, (2) information identifying the second in-network computation offload instance, (3) a service, function, or operation identifier, (4) service offload metadata, and (5) instructions for processing request packets.

8. The method of claim 3, further comprising:
    receiving, by the first in-network computation offload instance, a second request packet from the client application, wherein the second request packet includes a third application payload;
    determining, by the first in-network computation offload instance, whether to process the third application payload of the second request packet based on the stored first data from the second offload information;
    processing, by the first in-network computation offload instance, the third application payload in response to determining that the first in-network computation offload instance is to process the third application payload of the second request packet; and
    transmitting, by the first in-network computation offload instance, a second reply packet to the client application after successfully processing the third application payload.

9. The method of claim 8, further comprising:
    forwarding, by the first in-network computation offload instance in response to determining that the in-network computation offload instance is not to process the third application payload of the second request packet, the second request packet to the second in-network computation offload instance in the traffic flow between the client application and the server application,
    wherein determining whether to process the third application payload of the second request packet is based on a traffic flow identification of the second request packet.

10. The method of claim 8, wherein determining whether to process the third application payload of the second request packet is based on a traffic flow identification of the second request packet.

11. The method of claim 10, wherein when the first in-network computation offload instance determines to process the third application payload of the second request packet, the traffic flow identification indicates which offload operation to be performed by the first in-network computation offload instance for processing the third application payload of the second request packet.

12. An apparatus for offloading services of a server application in a network system comprising:
processing circuitry; and
a memory containing instructions which, when executed by the processing circuitry, cause the apparatus to:
receive a first request packet from a client application, wherein the first request packet includes a first application payload for processing by the server application;
generate a modified request packet that includes the first application payload and first offload information that describes a first in-network computation offload instance for use by the server application in coordinating offloading processing to one or more in-network computation offload instances;
transmit the modified request packet to either (1) a second in-network computation offload instance in the traffic flow between the client application and the server application or (2) the server application;
receive a modified reply packet that was generated by the server application;
determine that the modified reply packet includes a second application payload and second offload information that is addressed to the first in-network computation offload instance; and
transmit, by the first in-network computation offload instance, (1) the modified reply packet to a third in-network computation offload instance in the traffic flow between the client application and the server application, (2) a first reply packet that includes the second application payload to the third in-network computation offload instance, or (3) the first reply packet to the client application.

13. The apparatus of claim 12, wherein the first offload information includes one or more of (1) information describing the first in-network computation offload instance, including one or more of an identifier, capabilities, and supported offload service functions of the first in-network computation offload instance, (2) allocated resources for the first in-network computation offload instance, (3) available resources for the first in-network computation offload instance, (4) one or more timestamps related to the request packet, (5) data analytics, and (6) server application offload specific information.

14. The apparatus of claim 12, wherein the apparatus is further to:
store first data from the second offload information associated with processing application payloads of request packets by the first in-network computation offload instance on behalf of the server application.

15. The apparatus of claim 14, wherein the apparatus is further to:
receive an unsolicited packet from the server application, wherein the unsolicited packet includes third offload information that is addressed to the first in-network computation offload instance; and
store second data from the third offload information associated with processing application payloads of request packets by the first in-network computation offload instance on behalf of the server application such that the second data takes place of the first data.

16. The apparatus of claim 15, wherein the second offload information indicates a time limit for storing the first data from the second offload information by the first in-network computation offload instance and wherein the unsolicited packet is received from the server application based on expiration of the time limit.

17. The apparatus of claim 12, wherein the modified reply packet is received from the second in-network computation offload instance and was originally generated by the server application and wherein the second offload information includes second data associated with processing application payloads of request packets by the first in-network computation offload instance on behalf of the server application.

18. The apparatus of claim 12, wherein the second offload information includes one or more of (1) information identifying the first in-network computation offload instance, (2) information identifying the second in-network computation offload instance, (3) a service, function, or operation identifier, (4) service offload metadata, and (5) instructions for processing request packets.

19. The apparatus of claim 14, wherein the apparatus is further to:
receive a second request packet from the client application, wherein the second request packet includes a third application payload;
determine whether to process the third application payload of the second request packet based on the stored first data from the second offload information;
process the third application payload in response to determining that the first in-network computation offload instance is to process the third application payload of the second request packet; and
transmit a second reply packet to the client application after successfully processing the third application payload.

20. The apparatus of claim 19, wherein the apparatus is further to:
forward, in response to determining that the in-network computation offload instance is not to process the third application payload of the second request packet, the second request packet to the second in-network computation offload instance in the traffic flow between the client application and the server application,
wherein determining whether to process the third application payload of the second request packet is based on a traffic flow identification of the second request packet.

21. The apparatus of claim 19, wherein determining whether to process the third application payload of the second request packet is based on a traffic flow identification of the second request packet.

22. The apparatus of claim 21, wherein when the first in-network computation offload instance determines to process the third application payload of the second request packet, the traffic flow identification indicates which offload operation to be performed by the first in-network computation offload instance for processing the third application payload of the second request packet.

23. The apparatus of claim 19, wherein the apparatus is further to:
forward the second request packet, including third offload information, to the server application to indicate unsuccessful completion of processing the third application payload.

\* \* \* \* \*